US007026395B2

(12) United States Patent
Dalton et al.

(10) Patent No.: US 7,026,395 B2
(45) Date of Patent: *Apr. 11, 2006

(54) GOLF BALLS HAVING A COVER LAYER FORMED FROM AN IONOMER AND METALLOCENE-CATALYZED POLYOLEFIN BLEND AND METHODS OF MAKING SAME

(75) Inventors: Jeffrey L. Dalton, North Dartmouth, MA (US); Christopher Cavallaro, Lakeville, MA (US); Roman D. Halko, Chula Vista, CA (US); Murali Rajagopalan, South Dartmouth, MA (US); Kevin M. Harris, New Bedford, MA (US)

(73) Assignee: Acushnet Company, Fairhaven, CT (US)

( * ) Notice: Subject to any disclaimer, the term of this patent is extended or adjusted under 35 U.S.C. 154(b) by 51 days.

This patent is subject to a terminal disclaimer.

(21) Appl. No.: 10/661,532

(22) Filed: Sep. 15, 2003

(65) Prior Publication Data

US 2004/0063858 A1    Apr. 1, 2004

Related U.S. Application Data

(63) Continuation of application No. 09/962,644, filed on Sep. 26, 2001, now Pat. No. 6,653,403, which is a continuation-in-part of application No. 09/594,031, filed on Jun. 15, 2000, now Pat. No. 6,414,082, which is a continuation-in-part of application No. 09/436,738, filed on Nov. 9, 1999, now Pat. No. 6,384,136, which is a continuation of application No. 08/950,197, filed on Oct. 14, 1997, now Pat. No. 5,981,658, which is a continuation-in-part of application No. 08/658,338, filed on Jun. 5, 1996, now Pat. No. 5,824,746, which is a continuation-in-part of application No. 08/482,514, filed on Jun. 7, 1995, now Pat. No. 5,703,166, which is a continuation-in-part of application No. 08/377,553, filed on Jan. 24, 1995, now abandoned.

(51) Int. Cl.
A63B 37/12 (2006.01)
A63B 37/02 (2006.01)

(52) U.S. Cl. .................... 525/72; 525/74; 473/354; 473/365; 473/373; 473/374

(58) Field of Classification Search ............ 525/72, 525/74; 473/354, 365, 373, 374
See application file for complete search history.

(56) References Cited

U.S. PATENT DOCUMENTS

| | | |
|---|---|---|
| 3,572,722 A | 3/1971 | Harrison et al. ........... 273/218 |
| 4,274,637 A | 6/1981 | Molitor ................... 273/235 R |
| 4,431,193 A | 2/1984 | Nesbitt ................... 273/235 R |
| 4,781,383 A | 11/1988 | Kamada et al. ............ 273/228 |
| 4,884,814 A | 12/1989 | Sullivan ................ 273/235 R |
| 4,929,678 A | 5/1990 | Hamada et al. ............. 525/193 |
| 4,986,545 A | 1/1991 | Sullivan ................ 273/235 R |
| 5,002,281 A | 3/1991 | Nakahara et al. ........... 273/220 |
| 5,082,285 A | 1/1992 | Hamada et al. ............. 273/218 |
| 5,098,105 A | 3/1992 | Sullivan ................ 273/235 R |
| 5,106,916 A | 4/1992 | Mitchell .................. 525/255 |
| 5,187,013 A | 2/1993 | Sullivan ................... 428/407 |
| 5,312,857 A | 5/1994 | Sullivan ................... 524/400 |
| 5,321,089 A | 6/1994 | Cadorniga et al. .......... 525/196 |
| 5,330,837 A | 7/1994 | Sullivan ................... 428/407 |
| 5,334,673 A | 8/1994 | Wu .................... 273/235 R |
| 5,338,610 A | 8/1994 | Sullivan ................... 428/407 |
| 5,346,963 A | 9/1994 | Hughes et al. ............. 525/283 |
| 5,367,028 A | 11/1994 | Hamada et al. ............. 525/221 |
| 5,397,840 A | 3/1995 | Sullivan et al. ............ 525/221 |
| 5,407,998 A | 4/1995 | Horiuchi et al. ............ 525/133 |
| 5,484,870 A | 1/1996 | Wu ......................... 528/28 |
| 5,516,847 A | 5/1996 | Sullivan et al. ............ 525/221 |
| 5,542,677 A | 8/1996 | Sullivan et al. ............ 473/385 |
| 5,553,852 A | 9/1996 | Higuchi et al. ............. 473/373 |
| 5,586,950 A | 12/1996 | Endo ....................... 473/356 |
| 5,591,803 A | 1/1997 | Sullivan et al. ............ 525/196 |
| 5,703,166 A | 12/1997 | Rajagopalan et al. ....... 525/196 |
| 5,782,707 A | 7/1998 | Yamagishi et al. .......... 473/374 |
| 5,803,831 A | 9/1998 | Sullivan et al. ............ 473/374 |
| 5,824,746 A | 10/1998 | Harris et al. .............. 525/196 |
| 5,830,087 A | 11/1998 | Sullivan et al. ............ 473/385 |
| 5,833,552 A | 11/1998 | Hamada et al. ............. 473/359 |
| 5,919,101 A | 7/1999 | Yokota et al. .............. 473/374 |
| 5,981,658 A | 11/1999 | Rajagopalan et al. ......... 525/72 |
| 5,984,806 A | 11/1999 | Sullivan et al. ............ 473/373 |
| 6,015,356 A | 1/2000 | Sullivan et al. ............ 473/373 |
| 6,149,535 A | 11/2000 | Bissonnette et al. ........ 473/354 |
| 6,150,462 A | 11/2000 | Rajagopalan et al. ......... 525/74 |
| 6,162,135 A | 12/2000 | Bulpett et al. ............. 473/373 |

(Continued)

FOREIGN PATENT DOCUMENTS

EP    0 266 994 A2    5/1988

(Continued)

OTHER PUBLICATIONS

Ann M. Thayer, "Metallocene Catalysts Initiate New Era in Polymer Synthesis," Chemical & Engineering News, Sep. 11, 1995, pp. 15-20.

(Continued)

Primary Examiner—David J. Buttner
(74) Attorney, Agent, or Firm—Swidler Berlin LLP

(57) ABSTRACT

The disclosed invention provides a golf ball including a core and a cover of at least two layers, wherein the at least one cover layer includes an inner cover layer of at least one ionomer resin and an outer cover formed from a polymer blend including at least one grafted metallocene-catalyzed polymer and at least one ionomer neutralized with a metal cation, and optionally, a non-grafted metallocene-catalyzed polymer.

17 Claims, 2 Drawing Sheets

U.S. PATENT DOCUMENTS

| | | | |
|---|---|---|---|
| 6,291,592 B1 | 9/2001 | Bulpett et al. | 525/248 |
| 6,384,136 B1 | 5/2002 | Rajagopalan et al. | 525/72 |
| 6,414,082 B1 * | 7/2002 | Rajagopalan et al. | 525/74 |
| 6,458,895 B1 | 10/2002 | Wrigley et al. | 525/248 |
| 6,653,403 B1 * | 11/2003 | Dalton et al. | 525/72 |

FOREIGN PATENT DOCUMENTS

| | | |
|---|---|---|
| EP | 0 633 043 A1 | 1/1995 |
| GB | 2 278 609 A | 12/1994 |
| WO | WO 97/03123 | 1/1997 |
| WO | WO 97/03126 | 1/1997 |
| WO | WO 99/19030 | 4/1999 |
| WO | WO 00/38794 | 7/2000 |

OTHER PUBLICATIONS

P.S. Chum et al., "Structure/Property Relationships in Poplyolefins Made by Constrained Geometry Catalyst Technology," Plastics Engineering, Jun. 1995, pp. 21-23.

Smith et al., "Applications and Advantages of Flexible Metallocene Polyolefin Foams," SPO '95, 1995, pp. 95-107.

Sentinel Products Update, Metallocene Polyofefin Foam & Cellular Rubber, Summer 1995.

Jan H. Schut, "Competition for Metallocenes Could Turn Ugly," Plastics World, Jan. 1995, pp. 33-36.

Robert D. Leaversuch,"Metallocene Resins: Is the Revolution for Real?" Modern Plastics, Jun. 1994, pp. 48-50.

Exxon Chemical Co., "Exact Facts," Exxpol Technology, Jun. 1994 pp. 1-8.

T.C. Yu et al., "Polyolefin Modification with EXACT® Plastomers," SPE RETEC Polyolefins VIII Conference, Feb. 1993.

Matthew H. Naitove, "Novel Rheological Behavior Claimed for New-Tech Polyolefins," Plastics Technology, Nov. 1992, pp. 23 & 25.

* cited by examiner

GOLF BALLS HAVING A COVER LAYER FORMED FROM AN IONOMER AND METALLOCENE-CATALYZED POLYOLEFIN BLEND AND METHODS OF MAKING SAME

This application is a continuation of U.S. patent application Ser. No. 09/962,644, filed Sep. 26, 2001, now U.S. Pat. No. 6,653,403, which is a continuation-in-part of U.S. patent application Ser. No. 09/594,031, filed Jun. 15, 2000, now U.S. Pat. No. 6,414,082, which is a continuation-in-part of U.S. patent application Ser. No. 09/436,738, filed Nov. 9, 1999, now U.S. Pat. No. 6,384,136, which is continuation of U.S. patent application Ser. No. 08/950,197, filed Oct. 14, 1997, now U.S. Pat. No. 5,981,658, which is a continuation-in-part of U.S. patent application Ser. No. 08/658,338, filed Jun. 5, 1996, now U.S. Pat. No. 5,824,746, which is a continuation-in-part of U.S. patent application Ser. No. 08/482,514, filed Jun. 7, 1995, now U.S. Pat. No. 5,703,166, which is a continuation-in-part of U.S. patent application Ser. No. 08/377,553 filed Jan. 24, 1995, now abandoned. Each of these references are incorporated by reference herein in its entirety.

FIELD OF THE INVENTION

The present invention relates to golf balls and, in particular, to golf balls having a cover of at least two layers, wherein the inner cover layer material includes an ionomeric material, and the outer cover layer includes a blend of at least one grafted metallocene-catalyzed polymer and at least one ionomer resin neutralized with a metal cation. The outer cover layer blend may optionally include a non-grafted metallocene-catalyzed polymer. The golf balls of the present invention can provide low driver spin and high short iron and partial shot spin.

BACKGROUND OF THE INVENTION

Golf ball manufacturers are constantly attempting to construct golf balls having a desirable combination of good "feel," distance, and durability. One way in which the properties of a golf ball may be adjusted is through the cover composition and construction of the ball. Traditionally, softer feeling golf balls were obtained by providing an outer cover formed with natural or synthetic balata over a liquid center surrounded by a tensioned elastomeric wound layer. Because of its softness, however, balata is susceptible to cuts or other damage to the cover, and, thus, lacks the durability required to withstand the numerous mis-hits produced by the average golfer.

For this reason, amateur golfers typically prefer a golf ball constructed with a harder, more durable cover material, such as an ionomer or ionomer blend. Covers formed of ionomeric materials generally provide a good combination of distance and durability. Because of the hard ionomer cover, these balls are difficult to cut, but have a very hard "feel", and a lower spin rate, making these balls more difficult to draw or fade. The differences in the spin rate can be attributed to the differences in the composition and construction of both the cover and the core.

Many attempts have been made, therefore, to produce a golf ball with the control and feel of a balata-covered ball and the durability of an ionomer-covered ball. For example, U.S. Pat. No. 4,274,637 discloses two- and three-piece golf balls having covers completely or partially formed from a cellular polymeric material to improve backspin.

U.S. Pat. No. 5,002,281 discloses a three-piece solid golf ball having an ionomer cover and a solid core consisting of a soft inner core and a hard outer shell, where the difference in the hardness of the two parts of the core is at least 10 on the JIS-C scale.

Similarly, U.S. Pat. No. 4,781,383 discloses a solid, three-piece golf ball, having an ionomer cover and a core with inner and outer layers, where the inner layer has a diameter of 24 to 29 mm and a Shore D hardness of 15 to 30, and the outer layer has a diameter of 36 to 41 and a Shore D hardness of 55 to 65. The percentage of the ball surface which contacts the club face when the ball is struck is 27 to 35 percent.

European Patent Application No. 0 633 043 discloses a solid, three-piece golf ball with an ionomer or balata cover, a center core, and an intermediate layer. The center core has a diameter of at least 29 mm and a specific gravity of less than 1.4. The intermediate layer has a thickness of at least 1 mm, a specific gravity of less than 1.2, and a hardness of at least 85 on the JIS-C scale.

U.S. Pat. No. 5,586,950 discloses a golf ball having a core and a cover for covering the core, the cover comprising two ionomeric layers of an inner layer, with a high stiffness modulus of approximately 3,000 $kgf/cm^2$ (42,000 psi) to 5,500 $kgf/cm^2$ (78,000 psi) and a thickness of 0.5 to 2.5 mm, and an outer layer with a lower stiffness modulus of approximately 1,000 $kgf/cm^2$ (14,000 psi) to 2,500 $kgf/cm^2$ (35,000 psi) and a thickness of 0.5 to 2.5 mm. The base resin of the inner and outer cover layer contains an ionomer neutralized with a zinc ion.

U.S. Pat. No. 5,803,831 discloses a multi-layer golf ball having soft outer cover, preferably having a Shore D hardness of 48 or less, and a thermoplastic inner cover layer, preferably having a Shore D hardness of at least 65. The outer cover preferably includes at least 75 percent of a soft ionomeric neutralized copolymer formed from a polyolefin, an unsaturated carboxylic acid, and a monomer of the acrylate ester class.

U.S. Pat. Nos. 5,984,806 and 6,015,356 are directed to multi-layer golf balls with smaller and lighter cores produced by including metal particles, or other heavy weight filler materials, in the cover compositions. The covers may include an inner layer that includes a material having a flexural modulus of at least about 15,000 psi and a hardness of at least about 60 Shore D and an outer layer that includes a material, such as a blend of high and low ionomers, having a flexural modulus of from about 1,000 to 10,000 psi and a Shore D hardness of about 65 or less.

U.S. Pat. Nos. 5,553,852 and 5,782,707 disclose a three-piece solid golf ball having a center core, an intermediate layer, and a cover. The ionomeric resin intermediate layer can include various fillers. The outer cover layer, preferably a thermoplastic resin base composition, is softer than the intermediate layer. Iron shots and partial swing shots are affected by this cover design.

U.S. Pat. No. 5,919,101 discloses a solid golf ball comprising a core and a cover formed on the core, wherein the cover has a two-layer structure consisting of an inner cover having a flexural modulus of approximately 3,000 $kgf/cm^2$ (42,000 psi) to 7,000 $kgf/cm^2$ (99,000 psi) and an outer cover formed on the inner cover having a flexural modulus of approximately 1,000 $kgf/cm^2$ (14,000 psi) to 2,800 $kgf/cm^2$ (39,000 psi), and wherein the core is formed from a rubber composition comprising 0.05 to 5 parts by weight of an organic sulfide compound, based on 100 parts by weight of a base rubber. The cover layer can be an ionomer resin, a polyamide, or a nylon.

The above references, however, do not provide an ideal cover material for attaining both good feel and durability. One solution may be golf balls and, in particular, cover layers formed of or blended with metallocene-catalyzed polymers, i.e., polymers produced using single-site metallocene catalysts, which produce polymers with a narrow molecular weight distribution and uniform molecular architecture, so that the order and orientation of the monomers in the polymer, and the amount and type of branching is essentially the same in each polymer chain.

The narrow molecular weight distribution and uniform molecular architecture provides metallocene-catalyzed polymers with properties that are not available with conventional polymers, and allow polymers to be produced having unique properties that are specifically tailored to a particular application. The desired molecular weight distribution and the molecular architecture are obtained by the selection of the appropriate metallocene catalyst and polymerization conditions.

Processes for grafting monomers onto polymers and, in particular, polyolefins, are known in the art. European Patent Application No. 0 266 994 discloses a process for grafting ethylenically unsaturated monomers, such as unsaturated carboxylic acids and anhydrides and derivatives thereof, onto copolymers of ethylene. The disclosed process includes the steps of forming an admixture of the copolymer, monomer, and 25 to 3,000 ppm of an organic peroxide having a half-life of about one minute to 120 minutes at 150° C., and mixing the resultant admixture in an extruder at a temperature above the melting point of the copolymer for a period of time at least four times the half-life of the organic peroxide. The resultant grafted copolymer is then extruded into a shaped article.

U.S. Pat. No. 5,106,916 discloses a process for the catalytic grafting of an ethylenically unsaturated monomer onto a copolymer in which the process of EPA 0 266 994 is modified by the addition of a catalyst comprising water and at least one phosphorous-containing compound selected from the group consisting of compounds of formula HPO $(OR_1)_2$, phosphite compounds of formula $P(OR_2)_3$ and formula $(OR_3)P$—O—$R_4$—O—$P(OR_5)_2$, and di-substituted pentaerythritol diphosphites of formula $(R_6O)P$—$O_2$—$R_{PE}O_2$—$P(OR_7)$, where $O_2R_{PE}O_2$ is the pentaerythritol moiety, and $R_1$–$R_7$ are specified organic functional groups.

Grafted metallocene-catalyzed polymers, which are commercially available, share the advantages of non-grafted metallocene-catalyzed polymers, including a narrow molecular weight distribution and uniform molecular architecture. The addition of functional groups to the metallocene-catalyzed polymers by grafting allows polymers to be produced having properties that are not available with unfunctionalized metallocene-catalyzed polymers or polymers formed without the use of metallocene catalysts.

While different blend combinations of species of one variety of polymer, such as ionomers, have been successfully used in the prior art, different polymers, such as ionomers and balata or other non-ionic polymers have not been successfully blended for use in golf ball covers. In general, prior art blends of polymer components are immiscible, i.e., heterogeneous on a microscopic scale, and incompatible, i.e., heterogeneous on a macroscopic scale, unless strong interactions are present between the polymer components in the mixture, such as those observed between ionomers and polymers containing carboxylic acid groups. In particular, this lack of compatibility exists when an ionomer is blended with a polyolefin homopolymer, copolymer, or terpolymer that does not contain ionic, acidic, basic, or other polar pendant groups, and is not produced with a metallocene catalyst. These mixtures often have poor tensile strength, impact strength, and the like. Hence, golf balls produced from these incompatible mixtures would be expected to have inferior golf ball properties such as poor durability, cut resistance, and so on. In contrast, a compatible blend may be heterogeneous on a microscopic scale, but is homogeneous on a macroscopic scale, and, thus, has useful golf ball properties.

U.S. Pat. Nos. 5,397,840 and 5,516,847 are directed to golf ball covers comprising a blend of copolymers wherein one or more of the copolymers is a nonionic copolymer, such as a copolymer of ethylene and acrylic acid or methacrylic acid or a copolymer of propylene and acrylic acid, and one or more of the copolymers is an ionic copolymer, such as sodium and zinc neutralized copolymers of ethylene and acrylic acid. However, the "ionic copolymers" are defined in U.S. Pat. No. 5,397,840 as copolymers of an α-olefin and a metal salt of an α,β-unsaturated carboxylic acid, and the "non-ionic copolymers" are copolymers or terpolymers containing ethylene or propylene and acrylic or methacrylic acid monomers. Therefore, strong interactions exist between the metal salts of the "ionic copolymers" and the acrylic or methacrylic acid monomers of the "non-ionic copolymers" that allow compatible blends to be formed. These interactions do not exist in prior art blends of ionomers and polymers that are truly non-ionic or nonpolar, in particular, those polymers produced with a process that does not involve the use of a metallocene catalyst.

U.S. Pat. Nos. 4,986,545; 5,098,105; 5,187,013; 5,330,837; and 5,338,610 disclose golf balls having covers comprising blends of ionomers and modified thermoplastic elastomers, where the thermoplastic elastomers are conventional polymers, i.e., polymers polymerized using catalysts other than metallocene catalysts. The modified polymers include maleic anhydride modified ethylene-propylene copolymers, maleic anhydride modified styrenic block copolymers, maleic anhydride modified ethylene-vinyl acetate copolymers, brominated styrene-isobutylene copolymers, amine modified ethylene-propylene rubber, and polar modified para-methylstyrene-isobutylene copolymers. However, blends of ionomers with modified polyolefins are not exemplified.

U.S. Pat. Nos. 5,542,677 and 5,591,803 are directed to golf ball cover compositions containing blends of high or low carboxylic acid based copolymers and ethylene copolymers such as ethylene alkyl acrylates.

U.S. Pat. No. 5,321,089 is directed to a golf ball cover composition comprising a blend of ethylene-methyl acrylate, an ionomer resin, and a compatibilizer.

As shown in U.S. Pat. No. 5,703,166, metallocene-catalyzed polymers and ionomers form compatible blends of useful golf ball properties. However, there is no known prior art disclosure of golf balls incorporating compositions comprising grafted metallocene-catalyzed polymers.

U.S. Pat. No. 5,981,658 discloses golf ball compositions that contain non-ionic olefinic copolymers produced by metallocene catalysts functionalized with a post-polymerization reaction. The disclosed compositions exhibit improved mechanical properties, such as tensile strength and flexural modulus. The polymers disclosed in the '658 patent do not, however, address problems with processability of these types of polymers.

U.S. Pat. No. 5,830,087 discloses a multi-layer golf ball having a coefficient of restitution of at least about 0.78 with a central core, an inner cover layer containing a non-ionomeric polyolefin material, preferably a plastomer, and an outer cover layer including a thermoplastic material. The golf ball of the invention can be configured having an inner cover layer containing a non-ionomeric material, such as a metallocene-catalyzed polyolefin, and the outer cover layer containing ionomer.

It would be advantageous to provide a golf ball having a cover including at least two layers, wherein the outermost layer includes at least one grafted metallocene-catalyzed polymer, and preferably a blend including a metallocene-catalyzed polymer, to allow improved play characteristics with all types of clubs (i.e., high spin with irons and partial shots and low spin off the driver). The present invention provides such a cover.

SUMMARY OF THE INVENTION

The present invention is directed to a golf ball including a core and a cover, wherein at least one of the cover or the core is formed from a polymer blend including at least one grafted metallocene-catalyzed polymer, at least one ionomer, and at least one non-ionomer.

In one embodiment, the golf ball includes a cover having at least one of a dimple coverage of about 60 percent or greater, a hardness from about 35 to 80 Shore D, or a flexural modulus of about 500 psi or greater, and wherein the golf ball has at least one of a compression from about 50 to 120 or a coefficient of restitution of about 0.7 or greater.

In a preferred embodiment, the grafted metallocene-catalyzed polymer has a flexural modulus of from about 500 psi to 100,000 psi, the ionomer has a flexural modulus of from about 1,000 psi to 200,000 psi, and the non-ionomer has a flexural modulus of from about 500 psi to 100,000 psi. In one embodiment, the cover includes the polymer blend. In another embodiment, the cover layer material has a Shore D hardness of about 75 or less. In another embodiment, the cover layer has a thickness of from about 0.015 inches to 0.125 inches. In still another embodiment, the grafted metallocene-catalyzed polymer has been functionalized by grafting an ethylenically-unsaturated monomer onto the at least one metallocene-catalyzed polymer using a post-polymerization reaction. Preferably, the ethylenically-unsaturated monomer is an olefinic monomer having a functional group selected from the group consisting of sulfonic acid, sulfonic acid derivatives, chlorosulfonic acid, vinyl ethers, vinyl esters, primary amines, secondary amines, tertiary amines, mono-carboxylic acids, dicarboxylic acids, partially or fully ester derivatized mono-carboxylic acids, partially or fully ester derivatized dicarboxylic acids, anhydrides of dicarboxylic acids, cyclic imides of dicarboxylic acids, and ionomeric derivatives thereof, and combinations thereof. More preferably, the ethylenically-unsaturated monomer includes maleic anhydride.

In another embodiment, the at least one grafted metallocene-catalyzed polymer is present in an amount of from about 5 to 50 phr. Preferably, the at least one grafted metallocene-catalyzed polymer is present in an amount of from about 5 to 30 phr. In still another embodiment, the at least one ionomer is present in an amount of from about 95 to 50 phr. In a preferred embodiment, the at least one ionomer is present in an amount of from about 95 to 70 phr. In an alternative embodiment, the at least one non-ionomer is present in an amount of from about 1 to 25 phr. Preferably, the at least one non-ionomer is present in an amount of from about 5 to 20 phr.

In one embodiment, the core includes the polymer blend of the present invention. In an alternative embodiment, the core includes a center and at least one intermediate layer disposed between the center and the cover. The at least one intermediate layer may include the polymer blend while the cover includes a thermoset or thermoplastic material. Additionally, the cover may include the polymer blend and a thermoplastic material. The thermoplastic material may include at least one ionomer. Preferred thermoset materials, if used, include polyureas, polyurethanes, and mixtures thereof.

In yet another embodiment, at least one of the core, cover, or intermediate layer includes a density-adjusting filler. The density-adjusting filler preferably includes zinc oxide, barium sulfate, silica, calcium carbonate, zinc carbonate, tungsten, titanium, and mixtures thereof. In another embodiment, the at least one intermediate layer includes the polymer blend of the present invention. In one embodiment, the center is fluid-filled and, alternatively, in another embodiment, the center is a solid or hollow center. In still another embodiment, the at least one intermediate layer includes a tensioned elastomeric thread disposed about a fluid-filled center or a solid center.

In one embodiment, the grafted metallocene-catalyzed polymer is formed by grafting an ethylenically-unsaturated monomer onto a metallocene-catalyzed polymer selected from the group consisting of polyethylene and copolymers of ethylene with propylene, butene, pentene, hexene, heptene, octene, and norbornene. In another embodiment, the grafted metallocene-catalyzed polymer is formed by grafting an ethylenically-unsaturated monomer onto a metallocene-catalyzed polymer selected from the group consisting of polyethylene and copolymers of ethylene with butene. In a preferred embodiment, the grafted metallocene-catalyzed polymer is formed by grafting an ethylenically-unsaturated monomer onto a metallocene-catalyzed polymer of the formula:

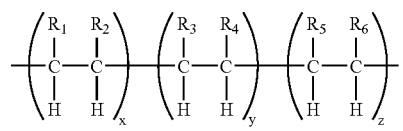

wherein $R_1$ is hydrogen; $R_2$ is hydrogen or lower alkyl selected from the group consisting of $CH_3$, $C_2H_5$, $C_3H_7$, $C_4H_9$, and $C_5H_{11}$; $R_3$ is hydrogen or lower alkyl selected from the group consisting of $CH_3$, $C_2H_5$, $C_3H_7$, $C_4H_9$, and $C_5H_{11}$; $R_4$ is selected from the group consisting of H, $CH_3$, $C_2H_5$, $C_3H_7$, $C_4H_9$, $C_5H_{11}$, $C_6H_{13}$, $C_7H_{15}$, $C_8H_{17}$, $C_9H_{19}$, $C_{10}H_{21}$, and phenyl, in which from 1 to 5 H and $R_4$ can be replaced by substituents selected from the group consisting of COOH, $SO_3H$, $NH_2$, F, Cl, Br, I, OH, SH, silicone, lower alkyl esters and lower alkyl ethers, with the proviso that $R_3$ and $R_4$ can be combined to form a bicyclic ring; $R_5$ is hydrogen, lower alkyl including $C_1$–$C_5$, carbocyclic, aromatic or heterocyclic; $R_6$ is hydrogen, lower alkyl including $C_1$–$C_5$, carbocyclic, aromatic or heterocyclic; and wherein x ranges from 99 to 50 weight percent of the polymer, y ranges from 1 to 50 weight percent of the polymer and z ranges from 0 to 49 weight percent of the polymer.

In one embodiment, the polymer blend has a foamed structure. In another embodiment, the non-ionomeric polymer has the chemical structure:

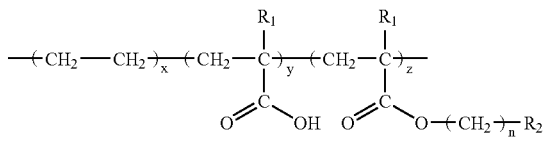

wherein x=50 to 99 weight %; y=1 to 50 weight %; z=0 to 49 weight %; $R_1$=H or $CH_3$; $R_2$=methyl, ethyl, propyl, butyl, pentyl, hexyl, hectyl, octyl, or isobornyl; and n=0 to 12. In yet another embodiment, the non-ionomer includes an olefinic homopolymer, an olefinic copolymer, an olefinic terpolymer, and mixtures thereof. Preferably, the non-ionomer is an acid-containing ethylene copolymer including ethylene/methacrylic acid, ethylene/acrylic acid, and mixtures thereof In another embodiment, the non-ionomer is an acid-containing ethylene terpolymer including ethylene/acrylic acid/n- or isobutyl acrylate, ethylene/methacrylic acid/n- or isobutyl acrylate, ethylene/acrylic acid/methyl acrylate, ethylene/methacrylic acid/methyl acrylate, ethylene/acrylic acid/isobornyl acrylate or methacrylate, ethylene/methacrylic acid/isobornyl acrylate or methacrylate, and mixtures thereof. It is preferred that the non-ionomer is present in an amount from about 1 phr to 25 phr of the total polymer. In an alternative embodiment, the polymer blend further includes a non-grafted metallocene-catalyzed copolymer. Preferably, the non-grafted metallocene-catalyzed copolymer includes polyolefin plastomers, polyolefin elastomers, or a mixture thereof.

The present invention is also directed to a golf ball including a core having a center, a cover, and at least one intermediate layer disposed between the core and the cover, wherein at least one of the cover, the center, and the at least one intermediate layer is formed from a polymer blend including from about 5 to 50 phr of at least one grafted metallocene-catalyzed polymer, from about 95 to 50 phr of at least one ionomer, and from about 1 to 25 phr of at least one non-ionomer.

The present invention is also directed to a golf ball including a core having a center, a cover, and at least one intermediate layer disposed between the core and the cover, wherein at least one of the cover, the center, and the at least one intermediate layer is formed from a polymer blend including from about 5 to 50 phr of at least one grafted metallocene-catalyzed polymer formed by grafting an ethylenically-unsaturated monomer onto a metallocene-catalyzed polymer selected from the group consisting of polyethylene and copolymers of ethylene and butene; from about 95 to 50 phr of at least two ionomers, each including an ethylene methacrylic/acrylic acid copolymer wherein at least one ionomer is partially neutralized with lithium and at least one ionomer is partially neutralized with sodium; and from about 1 to 25 phr of at least one non-ionomer of the chemical structure:

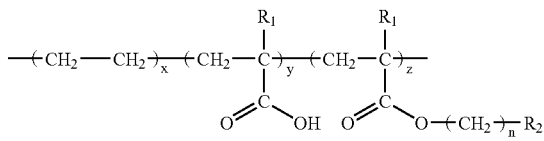

wherein x=50 to 99%; y=1 to 50%; z=0 to 49%; $R_1$=H or $CH_3$; $R_2$=methyl, ethyl, propyl, butyl, pentyl, hexyl, hectyl, octyl, and isobornyl; and n=0 to 12.

The present invention is also directed to a golf ball including a core, an inner cover having at least one layer including a material having a first Shore D hardness formed over the core and including a thermoplastic material, an outer cover layer including a material having a second Shore D hardness disposed about the inner cover, formed from a polymer blend including at least one grafted metallocene-catalyzed polymer and an ionomer component, wherein the first Shore D hardness is greater than the second Shore D hardness. In one embodiment, an intermediate layer, preferably a tensioned elastomeric layer, is situated between the core and the inner cover layer.

In one embodiment, the polymer blend includes about 30 percent by weight or greater of the at least one grafted metallocene-catalyzed polymer. In another embodiment, the polymer blend includes about 35 percent by weight or greater of the at least one grafted metallocene-catalyzed polymer.

In one embodiment, the thermoplastic material of the inner cover layer includes at least one ionomer resin. Preferably, the ionomer resin is neutralized with a metal cation including at least one of Na, Li, Ca, K, or Mg.

In another embodiment, the ionomer component of the outer cover layer blend includes at least two ionomer resins, each neutralized with a different metal cation selected from the group consisting of Zn, Na, Li, Ca, K, and Mg.

In one embodiment, the inner cover layer has a thickness of about 0.039 inches or less, preferably from about 0.02 inches to 0.038 inches.

In another embodiment, the first Shore D hardness is about 60 or greater and the second Shore D hardness is about 60 or less. In yet another embodiment, the first Shore D hardness is from about 65 to 80, and the second Shore D hardness is from about 45 to 60. In still another embodiment, the first Shore D hardness is from about 65 to 80, and the second Shore D hardness is from about 51 to 60.

In one embodiment, the outer cover layer material has a flexural modulus of about 10,000 psi or greater. In another embodiment, the outer cover layer has a thickness from about 0.01 inches to 0.1 inches, preferably from about 0.02 inches to 0.06 inches. In yet another embodiment, the golf ball has at least one of a compression of about 80 or less and a coefficient of restitution of about 0.8 or greater, or both.

In one embodiment, the core includes polybutadiene having an uncross-linked Mooney viscosity of about 40 or greater. In another embodiment, the core is substantially free of organic sulfides. In yet another embodiment, the core further includes at least one inorganic sulfide.

The core preferably has an outer diameter of about 1.51 inches or greater and a compression of about 90 or less, more preferably from about 65 to 90.

The present invention is also directed to a method of making a golf ball, including the steps of providing a golf ball, forming an inner cover having at least one layer, including a material having a Shore D hardness of about 60 or greater, and wherein the inner cover includes at least one ionomer resin and is substantially free of metallocene-catalyzed polymer, and forming an outer cover having at least one layer, including a polymer blend having a Shore D hardness of about 60 or less disposed about the inner cover, wherein the polymer blend includes at least one grafted metallocene-catalyzed polymer and at least one ionomer resin.

DEFINITIONS

Figure 1:
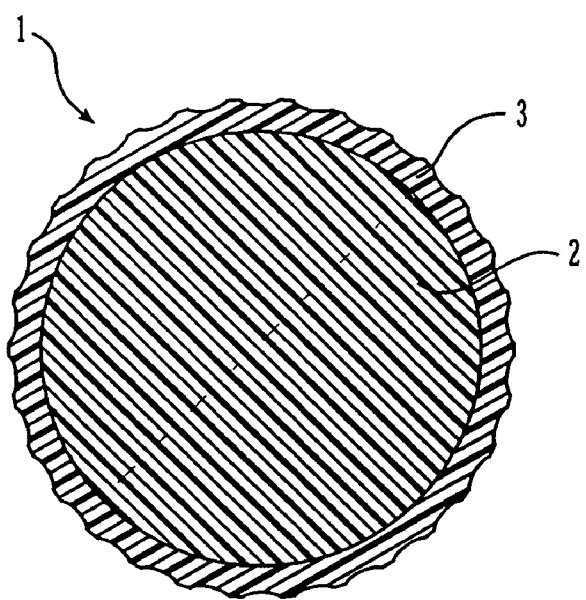
FIG. 1 is a cross-sectional view of a two-piece golf ball according to one embodiment of the invention with a cover and a core.

As used herein, the term "about," used in connection with one or more numbers or numerical ranges, should be understood to refer to all such numbers, including all numbers in a range.

As used herein, the term "Atti compression" is defined as the deflection of an object or material relative to the deflection of a calibrated spring, as measured with an Atti Compression Gauge, that is commercially available from Atti Engineering Corp. of Union City, N.J. Atti compression is typically used to measure the compression of a golf ball. When the Atti Gauge is used to measure cores having a diameter of less than 1.680 inches, it should be understood that a metallic or other suitable shim is used to make the measured object 1.680 inches in diameter.

As used herein, the term "metallocene-catalyzed polymer" refers to any polymer, copolymer, or terpolymer, and, in particular, any polyolefin, polymerized using a metallocene catalyst. The term "metallocene-catalyzed polymer blend" refers to any blend of a metallocene-catalyzed polymer and any other type of polymer, preferably an ionomer.

The terms "grafted metallocene-catalyzed polymer" and "grafted metallocene-catalyzed polymer blend" refer to any metallocene-catalyzed polymer or metallocene-catalyzed polymer blend in which the metallocene-catalyzed polymer has been subjected to a post-polymerization reaction to graft at least one functional group onto the metallocene-catalyzed polymer. A "post-polymerization reaction" is any reaction that occurs after the formation of the polymer by polymerization.

As used herein, the term "layer" includes any generally spherical portion of a golf ball or golf ball core, center, intermediate, or cover, including a one-piece ball. A "intermediate" is defined herein as a portion of the golf ball that occupies a volume between the cover and the core. Of course, as one of ordinary skill in the art would recognize, any of the core, cover, and intermediate of the golf balls of the invention can be formed of one layer or a plurality of layers, as that term is defined herein.

As used herein, the term "fluid" includes a liquid, a paste, a gel, a gas, or any combination thereof.

As used herein, the term "fillers" includes any compound or composition that can be used to adjust the density and/or other properties of the subject golf ball core.

As used herein, the term "compatible" with regard to a polymer blend refers to a blend of two or more polymers, having useful golf ball properties, that is homogeneous on a macroscopic scale. Compatible blends may be miscible, i.e., homogeneous on a microscopic scale, or at least partially immiscible, i.e., heterogeneous on a microscopic scale. The term "incompatible" refers to a mixture of at least two polymers that is heterogeneous on both a microscopic scale and a macroscopic scale, such that useful golf ball properties, such as durability, are lacking.

As used herein, the term "non-ionomer" refers to any non-ionomeric polymer, excluding the grafted metallocene-catalyzed polymers of the present invention.

As used herein, the term "multilayer" means at least two layers and includes fluid-center balls, hollow-center balls, and balls with at least two intermediate layers and/or cover layers.

As used herein, the term "coefficient of restitution" ("COR") for golf balls is defined as the ratio of the rebound velocity to the inbound velocity when balls are fired into a rigid plate. The inbound velocity is understood to be 125 ft/s.

As used herein, the term "dynamic stiffness" is defined as load divided by the deflection for a 1.4-mm spherical radius penetration probe oscillating at 1 Hz with an amplitude of 100 µm. The probe dynamically penetrates the surface of a sample material. Material samples of spherical cores were prepared by sectioning out a 6-mm-thick layer along the equator of core to produce a disk 6 mm thick with one surface containing the geometric center of the core. By positioning the probe at any selected radial position on the disk, a dynamic stiffness measurement may be obtained. Accurate dynamic measurements may be made by keeping the material sample at a substantially uniform temperature. The dynamic stiffness was acquired using a Dynamic Mechanical Analyzer, Model DMA 2980 available from TA Instruments Corporation of New Castle, Del. The instrument setting for the DMA 2980 were 1-Hz frequency, 100-µm amplitude, 0.3-N static load, and auto strain of 105 percent. The 1.4-mm spherical radius probe is available from TA Instruments as a penetration kit accessory to the DMA 2980. The DMA 2980 is equipped with a temperature-controlled chamber that enables testing at a wide variety of ambient temperatures.

The method and instrument utilized for measuring "dynamic stiffness" may also be used to measure loss tangent. Loss tangent is the ratio of loss modulus to storage modulus. Loss modulus is the portion of modulus which is out of phase with displacement and storage modulus is the portion of modulus which is in phase with displacement. The DMA 2980 automatically calculates and reports loss tangent.

As used herein, the term "parts per hundred," also known as "phr," is defined as the number of parts by weight of a particular component present in a mixture, relative to 100 parts by weight of the total polymer component. Mathematically, this can be expressed as the weight of an ingredient divided by the total weight of the polymer, multiplied by a factor of 100.

As used herein the term "resilience index" is defined as the difference in loss tangent (tan δ) measured at 10 cpm and 1000 cpm divided by 990 (the frequency span) multiplied by 100,000 (for normalization and unit convenience). The loss tangent is measured using an RPA 2000 manufactured by Alpha Technologies of Akron, Ohio. The RPA 2000 is set to sweep from 2.5 to 1000 cpm at a temperature of 100° C. using an arc of 0.5 degrees. An average of six loss tangent measurements were acquired at each frequency and the average is used in calculation of the resilience index. The computation of resilience index is as follows:

$$\text{Resilience Index} = 100{,}000 \cdot [(\text{loss tangent}@10\ cpm) - (\text{loss tangent}@1000\ cpm)]/990$$

As used herein, the term "substantially free" means less than about 5 weight percent, preferably less than about 3 weight percent, more preferably less than about 1 weight percent, and most preferably less than about 0.01 weight percent.

As defined herein, the term "high flexural modulus" typically means a flexural modulus of at least about 65,000 psi, unless otherwise noted.

The following terms that are used in this application can be measured in terms of the ASTM tests:

| | |
|---|---|
| Flexural (Flex) Modulus | ASTM D6272-98, Procedure B |
| Shore C & D Hardness | ASTM D2240-00 |
| Mooney Viscosity | ASTM D1646-99 |

DETAILED DESCRIPTION OF THE INVENTION

The present invention relates to golf balls including at least one foamed or unfoamed layer that comprises one or more grafted metallocene-catalyzed polymers. As noted above, the layer may be in any of the core or the cover. In one embodiment, the core includes a center and at least one intermediate layer situated between the center and the cover. The grafted metallocene-catalyzed polymer may be blended with other types of polymers, such as non-grafted metallocene-catalyzed polymers, ionomers, non-ionomers, and thermoplastic elastomers. In one preferred embodiment, the cover layer includes grafted metallocene-catalyzed polymer blended with at least one ionomer resin. In another preferred embodiment, the grafted metallocene-catalyzed polymer is blended with at least one ionomer and at least one non-ionomer. Such blends are particularly useful in forming the outer cover layer of a golf ball according to the present invention. Grafted metallocene-catalyzed polymers and grafted metallocene-catalyzed polymer blends are resilient, easily processed materials that are less expensive than ionomers, and allow highly durable golf balls to be produced with improved performance and virtually any combination of feel and spin rate.

The golf ball of the present invention is believed to provide a benefit for both a golfer's long and short game. The spin of a ball after being contacted by a driver is controlled by the softness (flexibility) of the cover and the compressibility of the inner core of the golf ball. Also, softer covers can improve short game spin (e.g., when using a wedge with a short swing) making control of the golf ball in and around the green more achievable. The softer the cover relative to the inner core, the higher the driver spin. On the other hand, if the inner core is softened, driver spin decreases. Unfortunately, if both the cover and the core are too soft, the golf ball loses resiliency and the resulting initial velocity and distance that are also desired in a golf ball. Therefore, golf ball manufacturers are challenged with making a soft cover golf ball with low driver spin and high short iron and partial shot spin, which the present invention advantageously provides.

This combination of a hard inner cover layer with a soft, relatively low flexural modulus material outer cover layer, typically a low modulus ionomer, provides excellent ball resilience because of the improved resiliency by the inner cover layer. A golf ball having a thin outer cover layer including at least one grafted metallocene-catalyzed polyolefin to maintain the "soft" feel while still increasing resiliency, can accomplish this goal while eliminating the need for soft, low modulus ionomers in the outer cover. While some improvement in resiliency is produced by the outer cover layer, the outer cover layer role in the golf ball of this invention is to provide a desirable "soft" feel and agreeable spin characteristics.

The grafted metallocene-catalyzed polymer can be included in any layer. In a preferred embodiment, for example, the golf ball includes a core and a cover layer of at least two layers, wherein the outer cover layer includes at least one grafted metallocene-catalyzed polymer and the inner cover layer includes at least one ionomer resin, but is free of grafted metallocene-catalyzed polymer.

For example, FIG. 1 shows a golf ball according to the invention having a one-piece core. Golf ball 1 includes a core 2 and a cover 3, wherein either of core 2 or cover 3 incorporates at least one layer comprising a foamed or unfoamed grafted metallocene-catalyzed blend. In a preferred embodiment, however, the cover 3 includes at least two layers, an inner and an outer cover layer, and the inner cover layer includes at least one ionomer resin, but no grafted metallocene-catalyzed polymer, and the outer cover layer includes at least one grafted metallocene-catalyzed polymer, preferably in a blend with an ionomer resin.

Figure 2:
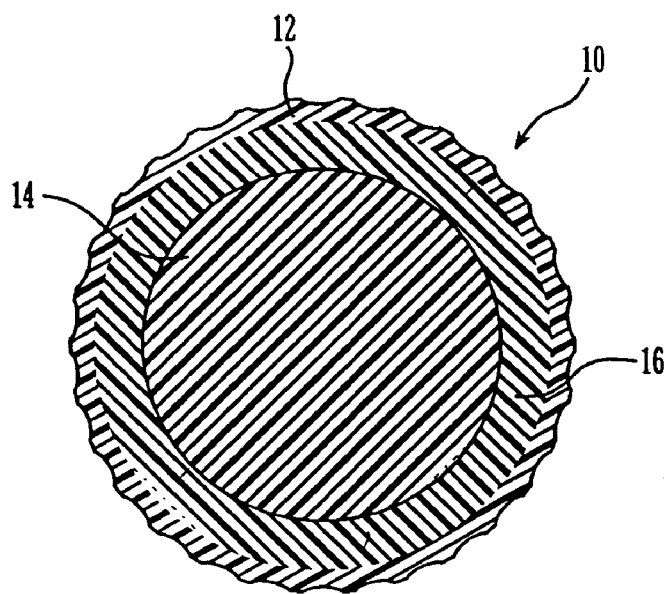
FIG. 2 is a cross-sectional view of a golf ball according to one embodiment of the invention incorporating a multilayer cover.

In one embodiment, as shown in FIG. 2, a golf ball according to the invention incorporates a multi-piece core. Golf ball 10 includes a cover 12 and a core having a center 14 and at least one intermediate layer 16. Any of the cover 12, center 14, or intermediate layer 16 may incorporate at least one layer of a foamed or unfoamed grafted metallocene-catalyzed blend. It should be understood that a center and any intermediate layers are typically referred to herein as a "core". In the preferred embodiment, the intermediate layer 16 is optional and the cover 12 includes at least two layers, an inner and an outer cover layer. The inner cover layer includes at least one ionomer resin, but no grafted metallocene-catalyzed polymer, and the outer cover layer includes at least one grafted metallocene-catalyzed polymer, preferably in a blend with an ionomer resin.

Figure 3:
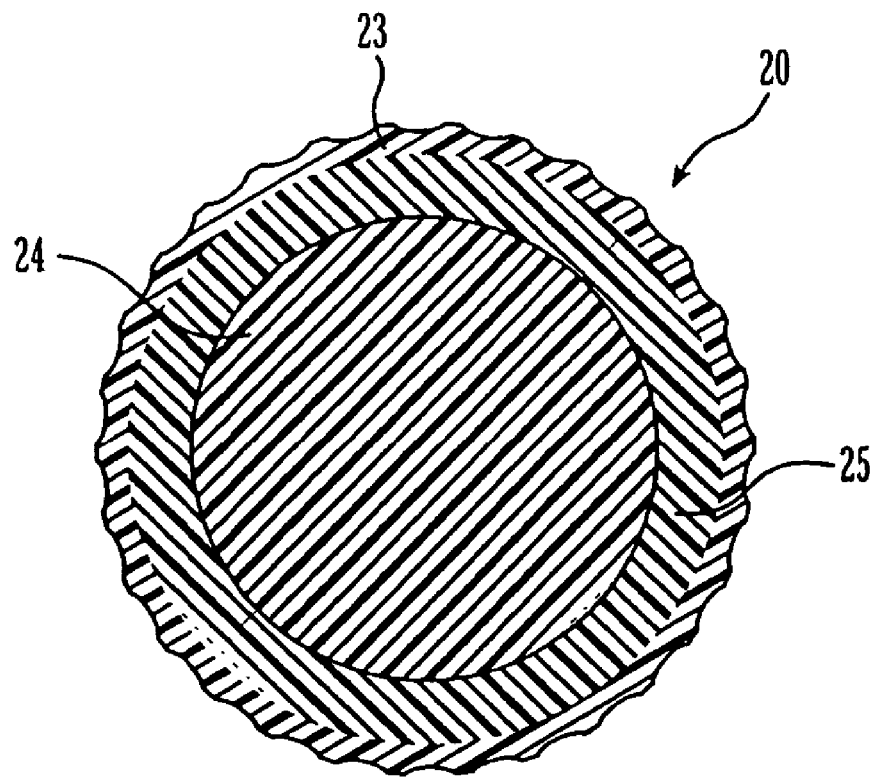
FIG. 3 is a cross-sectional view of a golf ball according to the invention incorporating an intermediate layer between the cover and the core.

Golf balls of the invention may also include an intermediate layer situated between the cover and the center. In one preferred embodiment, the intermediate layer includes a least one layer of a foamed or unfoamed grafted metallocene-catalyzed polymer or polymer blend, but may also be formed from a non-grafted metallocene-catalyzed polymer or polymer blend or from any other suitable polymeric material having the desired properties. A golf ball incorporating an intermediate layer is illustrated in FIG. 3, which depicts golf ball 20, having cover 23, center 24, and an intermediate layer 25 situated between the cover and the center 24. Any of cover 23, center 24, and intermediate layer 25 may incorporate at least one layer of a foamed or unfoamed grafted metallocene-catalyzed polymer or polymer blend, at least one ionomer, and at least one non-ionomer. In the preferred form of the invention, the cover 23 includes at least two layers, an inner and an outer cover layer, with the proviso that the inner cover layer, including ionomer resin, does not include grafted metallocene-catalyzed polymer.

The grafted metallocene-catalyzed polymer may be blended with other types of polymers, such as non-grafted metallocene-catalyzed polymers, ionomers, non-ionomers, and thermoplastic elastomers. Preferably, the grafted metallocene-catalyzed polymer is blended with at least one ionomer.

Grafted metallocene-catalyzed polymer blends useful in the invention typically include a compatible blend of about 1 to 75 parts per hundred ("phr") of the total polymer blend of at least one grafted metallocene-catalyzed polymer, about 99 to 25 phr of at least one ionomer, and about 1 to 70 phr of at least one non-ionomer. Preferably, the blends of the present invention include from about 5 to 50 phr of at least one grafted metallocene-catalyzed polymer, about 95 to 50 phr of at least one ionomer, and about 1 to 40 phr of at least one non-ionomer. More preferably, the blends of the present invention include from about 10 to 30 phr of at least one grafted metallocene-catalyzed polymer, about 90 to 70 phr of at least one ionomer, and about 1 to 20 phr of at least one non-ionomer. Most preferably from about 15 to 25 phr of at least one grafted metallocene-catalyzed polymer and about to 75 phr of at least one ionomer, and about 1 to 10 phr of at least one non-ionomer. Where the layer is foamed, the grafted metallocene-catalyzed polymer blends may be foamed during molding by any conventional foaming or blowing agent.

Grafted metallocene-catalyzed polymers and polymer blends may be thermoformed and, thus, can be either compression or injection molded to form a layer of foamed or unfoamed grafted metallocene-catalyzed polymer in the cover, center, or at least one intermediate layer, if present, of a golf ball according to the invention. Grafted metallocene-catalyzed polymers and grafted metallocene-catalyzed polymer blends are resilient, easily processed materials that are less expensive than ionomers, and allow highly durable golf balls to be produced with improved performance and virtually any combination of feel and spin rate.

The narrow molecular weight distributions of metallocene-catalyzed polymers provide more uniform compositions and improved mechanical properties when compared to polyolefins polymerized with conventional catalysts. In addition, when the metallocene-catalyzed polymer is modified by a post-polymerization reaction to add at least one pendant functional group to the metallocene-catalyzed polymer, the compatibility of the resulting grafted metallocene-catalyzed polymer with other polymers, and with ionomers in particular, is improved. As a result, blends of grafted metallocene-catalyzed polymers, ionomers, and non-ionomers have superior golf ball properties, including performance and durability. For example, as demonstrated in the examples below, a compatible blend of a grafted metallocene-catalyzed polymer, an ionomer, and a non-ionomer results in a golf ball cover composition that provides increased softness ("feel") without losing resilience or distance (for a given cover hardness), when compared to covers comprising a blend of a grafted metallocene-catalyzed polymer and an ionomer. Additionally, golf balls constructed with the cover blends of the present invention exhibit increased control, in part due to decreased driver spin and increased wedge spin.

When a layer of foamed or unfoamed metallocene-catalyzed polymer or polymer blend is used in a golf ball cover or intermediate layer, the ball has a softer feel than a ball made using a hard ionomer. Moreover, when the layer in the cover or the intermediate includes a grafted metallocene-catalyzed polymer or polymer blend, the performance of the resulting golf ball, in particular, the initial velocity, is also significantly improved.

The use of foamed grafted metallocene-catalyzed polymer also allows the golf ball designer to adjust the density or mass distribution of the ball to adjust the angular moment of inertia, and, thus, the spin rate and performance of the ball. Foamed materials also offer a potential cost savings due to the reduced use of polymeric material.

Grafted metallocene-catalyzed polymers useful in the golf balls of the invention are commercially available from DuPont under the tradenames SURLYN® NMO 525D, SURLYN® NMO 524D, and SURLYN® NMO 499D, all formerly known as the FUSABOND® family of polymers, or may be obtained by subjecting a non-grafted metallocene-catalyzed polymer to a post-polymerization reaction to provide a grafted metallocene-catalyzed polymer with the desired pendant group or groups. Examples of metallocene-catalyzed polymers to which functional groups may be grafted for use in the invention include, but are not limited to, homopolymers of ethylene and copolymers of ethylene and a second olefin, preferably, propylene, butene, pentene, hexene, heptene, octene, and norbornene, more preferably, butene, pentene, hexene, heptene, octene, and norbornene, and most preferably butene. Generally, the invention includes golf balls having at least one layer including at least one grafted metallocene-catalyzed polymer or polymer blend, where the grafted metallocene-catalyzed polymer is produced by grafting a functional group onto a metallocene-catalyzed polymer having the formula:

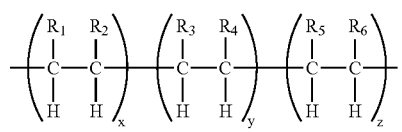

wherein $R_1$ is hydrogen, branched or straight chain alkyl such as methyl, ethyl, propyl, butyl, pentyl, hexyl, heptyl, and octyl, carbocyclic, aromatic or heterocyclic;

$R_2$ is hydrogen, lower alkyl including $C_1$–$C_5$; carbocyclic, aromatic or heterocyclic $R_3$ is hydrogen, lower alkyl including $C_1$–$C_5$, carbocyclic, aromatic or heterocyclic;

$R_4$ is selected from the group consisting of H, $C_nH_{2n+1}$, where n=1 to 18, and phenyl, in which from 1 to 5 H within $R_4$ can be replaced by substituents selected from the group consisting of COOH, $SO_3H$, $NH_2$, F, Cl, Br, I, OH, SH, silicone, lower alkyl esters and lower alkyl ethers, with the proviso that $R_3$ and $R_4$ can be combined to form a bicyclic ring;

$R_5$ is hydrogen, lower alkyl including $C_1$–$C_5$, carbocyclic, aromatic or heterocyclic;

$R_6$ is hydrogen, lower alkyl including $C_1$–$C_5$, carbocyclic, aromatic or heterocyclic; and wherein x, y and z are the relative percentages of each co-monomer. The number x can range from 1–99 percent or more preferably from 10–70 percent and most preferred, from about 10–50 percent. The number y can be from 99–1 percent, preferably, from 90–30 percent, or most preferably, 90–50 percent. The number z can range from 0 to 49 percent.

Preferably, the preferred grafted metallocene-catalyzed polymer is formed by grafting a functional group onto a metallocene-catalyzed polyethylene or a metallocene-catalyzed polymer of the formula given above in which $R_1$ is hydrogen or lower alkenyl, $R_2$ is hydrogen or alkyl, including carbon chains having from 1 to 10 carbon atoms, $R_3$ is hydrogen or lower alkyl or alkenyl such as carbon chains having 1–10 carbon atoms, and $R_4$ is a lower alkyl group having from 1–10 carbon atoms. For terpolymers, where z is not zero, $R_5$ is preferably hydrogen or lower alkyl or alkenyl such as carbon chains having 1–10 carbon atoms, and $R_6$ is a lower alkyl group having from 1–10 carbon atoms. In the most preferred copolymer, $R_1$ and $R_2$ are hydrogen, $R_3$ is hydrogen, methyl, ethyl, propyl, butyl, pentyl, hexyl, heptyl or octyl, and $R_4$ is a straight carbon chain having 6 carbon atoms. For terpolymers, $R_5$ is most preferably hydrogen, methyl, ethyl, propyl, butyl, pentyl, hexyl, heptyl or octyl, and $R_6$ is a straight carbon chain having 6 carbon atoms.

Metallocene-catalyzed copolymers or terpolymers can be random or block copolymers or terpolymers, and may be isotactic, syndiotactic or atactic. The pendant groups creating the isotactic, syndiotactic, or atactic polymers are chosen to determine the interactions between the different polymer chains making up the resin to control the final properties of the resins used in golf ball covers, centers, or intermediate layers. As will be clear to those skilled in the art, grafted metallocene-catalyzed polymers useful in the invention that are formed from metallocene-catalyzed random or block copolymers or terpolymers will also be random or block copolymers or terpolymers, and will have the same tacticity of the metallocene-catalyzed polymer backbone.

As used herein, the term "phrase branched or straight chain alkyl" means any substituted or unsubstituted acyclic carbon-containing compounds, including alkanes, alkenes and alkynes. Examples of alkyl groups include lower alkyl, for example, methyl, ethyl, n-propyl, isopropyl, n-butyl, isobutyl or tert-butyl; upper alkyl, for example, octyl, nonyl, decyl, and the like; and lower alkylene, for example, ethylene, propylene, butylene, pentene, hexene, heptene, octene, norbornene, nonene, decene, and the like. The ordinary skilled artisan is familiar with numerous linear and branched alkyl groups, all of which are within the scope of the present invention.

In addition, such alkyl groups may also contain various substituents in which one or more hydrogen atoms has been replaced by a functional group. Functional groups include, but are not limited to hydroxyl, amino, carboxyl, sulfonic amide, ester, ether, phosphates, thiol, nitro, silane, and halogen (fluorine, chlorine, bromine and iodine), to mention but a few.

As used herein, the term "substituted and unsubstituted carbocyclic" means cyclic carbon-containing compounds, including, but not limited to cyclopentyl, cyclohexyl, cycloheptyl, adamantyl, and the like. Such cyclic groups may also contain various substituents in which one or more hydrogen atoms has been replaced by a functional group. Such functional groups include those described above, and lower alkyl groups having from 1–28 carbon atoms. The cyclic groups of the invention may further include a heteroatom.

As used herein, the term "substituted and unsubstituted aryl groups" includes, but is not limited to, phenyl, naphthyl, anisyl, toluyl, xylenyl and the like. According to the present invention, aryl also includes heteroaryl groups, e.g., pyrimidine or thiophene. These aryl groups may also be substituted with any number of a variety of functional groups. In addition to the functional groups described above in connection with substituted alkyl groups and carbocyclic groups, functional groups on the aryl groups can include nitro groups.

As mentioned above, $R_1$ and $R_2$ can also represent any combination of alkyl, carbocyclic or aryl groups, for example, 1-cyclohexylpropyl, benzyl cyclohexylmethyl, 2-cyclohexylpropyl, 2,2-methylcyclohexylpropyl, 2,2-methylphenylpropyl, 2,2-methylphenylbutyl.

Non-grafted metallocene-catalyzed polymers useful in the present invention are commercially available under the trade name AFFINITY® polyolefin plastomers and ENGAGE® polyolefin elastomers commercially available from Dow Chemical Company and DuPont-Dow of Michigan. Other commercially available metallocene-catalyzed polymers can be used such as Exxon's EXACT® and Dow's INSIGHT® line of resins which have superior flexibility and clarity as well as toughness. The EXACT® and INSIGHT® line of polymers also have novel rheological behavior in addition to their other properties as a result of using a metallocene catalyst technology. Metallocene-catalyzed polymers are also readily available from Sentinel Products Corporation of Hyannis, Mass., as foamed sheets for compression molding. The foamed grafted metallocene-catalyzed polymers sheets are available in thicknesses ranging from about 0.027 to 0.625 inches. Closed cell bun stock is also available in thicknesses of up to 4 inches.

In addition, grafted metallocene-catalyzed polymers may be formed from commercially available metallocene-catalyzed polymers using post-polymerization reactions known in the art. For example, the grafted metallocene-catalyzed polymers may be formed using the method disclosed in EPA 0 266 994 by admixing a metallocene-catalyzed polymer with a monomer capable of bonding to the metallocene-catalyzed polymer and an organic peroxide, and mixing the admixture at a temperature greater than the melting point of the metallocene-catalyzed polymer for a time sufficient for the post-polymerization reaction to occur. Typically, the mixing is continued for at least four times the half-life of the organic peroxide. Although the monomer, metallocene-catalyzed polymer, and the peroxide may be added in any order, preferably, the metallocene-catalyzed polymer and monomer are thoroughly mixed before the peroxide is added.

Monomers useful in the present invention include, but are not limited to olefinic monomers having, as a functional group, sulfonic acid, sulfonic acid derivatives, such as chlorosulfonic acid, vinyl ethers, vinyl esters, primary, secondary, and tertiary amines, mono-carboxylic acids, dicarboxylic acids, partially or fully ester derivatized mono-carboxylic acids and dicarboxylic acids, and anhydrides of dicarboxylic acids, and cyclic imides of dicarboxylic acids. In polyethylene, the post-polymerization reaction results in the substitution of the monomer for a hydrogen on the polymer backbone. Because all of the secondary hydrogen atoms are equivalent in polyethylene, the pendant group may replace any of the secondary hydrogens on the polymer. In copolymers and polymers of olefins other than ethylene, which contain both secondary and tertiary hydrogens, the tertiary hydrogens are more labile, and, thus, the reaction occurs substantially exclusively at the site of the tertiary hydrogens.

In addition, metallocene-catalyzed polymers may also be functionalized by sulfonation, carboxylation, or the addition of an amine or hydroxy group. Metallocene-catalyzed polymers functionalized by sulfonation, carboxylation, or the addition of a hydroxy group may be converted to anionic ionomers by treatment with a base. Similarly, metallocene-catalyzed polymers functionalized by the addition of an amine may be converted to cationic ionomers by treatment with an alkyl halide, acid, or acid derivative.

The most preferred monomer is maleic anhydride, which, once attached to the metallocene-catalyzed polymer by the post-polymerization reaction, may be further subjected to any reaction to which an anhydride may be subject to form a grafted metallocene-catalyzed polymer containing other pendant or functional groups. For example, reaction with water will convert the anhydride to a dicarboxylic acid, reaction with ammonia forms an amide, reaction with an alcohol results in the formation of an ester, and reaction with base results in the formation of an anionic ionomer.

In particular, maleic anhydride, which has the formula

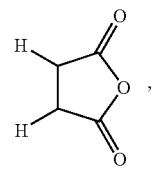

may be grafted onto a metallocene-catalyzed polymer by means of a post-polymerization reaction, as described above. The maleic anhydride will graft onto a metallocene-catalyzed polymer of formula

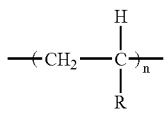

to form a grafted metallocene-catalyzed polymer of formula

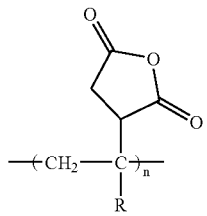

where R is not H, the monomer being grafted to the metallocene-catalyzed polymer will always replace the tertiary H because the tertiary H is more labile than the secondary H. Clearly, in polyethylene, where every H is a secondary H, the monomer must replace a secondary H. Where the monomer is a maleic anhydride, the resulting grafted metallocene-catalyzed polymer may be reacted with water to form

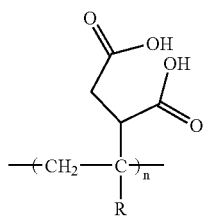

which may be further reacted with a base of formula MOH to form an ionomer of formula

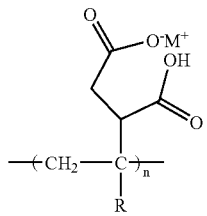

or either formula

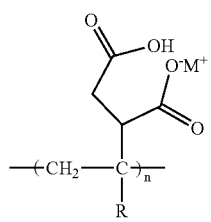 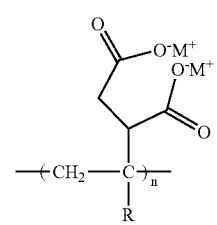

or reacted with a base of formula M(OH)$_2$ to form an ionomer of formula

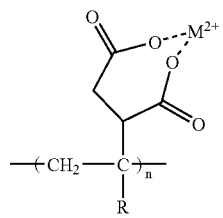

A maleic anhydride grafted metallocene-catalyzed polymer may also be reacted with ammonia to form

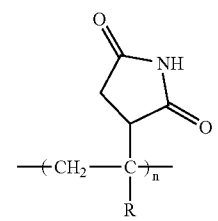

It has been discovered that maleic anhydride grafted metallocene-catalyzed polymers are formed of highly compatible blends with ionomers and other thermoplastic polymers.

In addition, unsaturated carboxylic acids, such as methacrylic and acrylic acid, can be grafted to a metallocene-catalyzed polymer to form

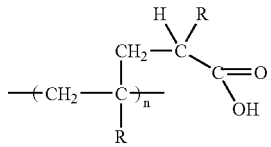

which may be reacted with a base to form an ionomer. Sulfur compounds, such as H$_2$SO$_4$, ClSO$_3$H, or SO$_3$, when grafted to a metallocene-catalyzed polymer will form polymers of formula

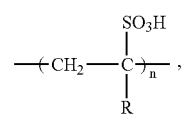

Grafting a vinyl ester of formula CH$_2$=CH—COOR gives polymers of formula

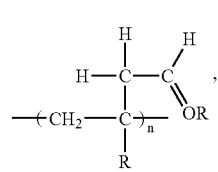

and a primary or secondary amine or other suitable nitrogen compound provides polymers of formula

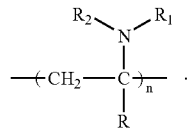

If a monomer of formula

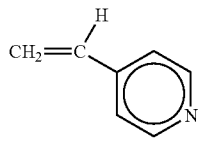

is used, the resulting grafted metallocene-catalyzed polymer of formula

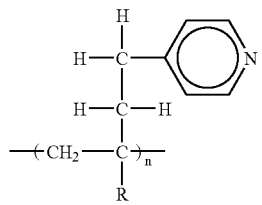

may be reacted with an acid or acid derivative or a compound of formula $R^+X^-$, where R may be a linear or branched alkyl group having from 1 to 12 carbon atoms, and X may be a halide, to form a cationic ionomer.

The grafted metallocene-catalyzed polymer blend golf ball compositions of the present invention include compatible blends of at least one grafted metallocene-catalyzed polymer, at least one ionomer, and at least one non-ionomer. Blends useful in the golf ball of the invention may be formed using blending methods well known in the art. In particular, the grafted metallocene-catalyzed polymer blends include compatible blends of grafted metallocene-catalyzed polymers, ionomers, such as ethylene methacrylic acid ionomers and ethylene acrylic acid ionomers, and their terpolymers, sold commercially under the tradenames SURLYN® and IOTEK® by DuPont and Exxon, respectively, and non-ionomers, such as NUCREL®, also sold commercially by DuPont.

The grafted metallocene-catalyzed polymers useful in the golf balls of the invention can also be blended with non-grafted metallocene-catalyzed polymers and other non-ionomeric polymers, such as poly(ethylethylene), poly(heptylethylene), poly(hexyldecylethylene), poly(isopentylethylene), poly(1,1-dimethyltrimethylene), poly(1,1,2-trimethyltrimethylene), poly(butyl acrylate), poly(2-ethylbutyl acrylate), poly(heptyl acrylate), poly(2-methylbutyl acrylate), poly(3-methylbutyl acrylate), poly(N-octadecylacrylamide), poly(octadecyl methacrylate), poly(butoxyethylene), poly(methoxyethylene), poly(pentyloxyethylene), poly(1,1-dichloroethylene), poly(cyclopentylacetoxyethylene), poly(4-[(2-butoxyethoxy)methyl]styrene), poly(4-dodecylstyrene), poly(4-tetradecylstyrene), poly(phenylmethylethylene), poly[oxy(ethoxymethyl)ethylene], poly(oxyethylethylene), poly(oxytetramethylene), poly(oxytrimethylene), poly(oxycarbonylpentamethylene), poly(oxycarbonyl-3-methylpentamethylene), poly(oxycarbonyl-1,5-dimethylpentamethylene), poly(silanes) and poly (silazanes), main-chain heterocyclic polymers, polyurethanes, polyamides, polyimides, polyesters, polyethers, and polycarbonates, polyketones, poly(trimethylene terephthalate) ("PTT"), polyphenylene ether, poly(butylene terephthalate), or a combination thereof, as well as the classes of polymers to which they belong.

Any non-ionomeric polymer available to one of ordinary skill in the art may be included in the blends according to the invention. Preferred non-ionomeric polymers include acid-containing ethylene copolymers, such as ethylene/acrylic acid; ethylene/methacrylic acid; ethylene/acrylic acid/n- or isobutyl acrylate; ethylene/methacrylic acid/n- or isobutyl acrylate; ethylene/acrylic acid/methyl acrylate; ethylene/methacrylic acid/methyl acrylate; ethylene/acrylic acid/isobornyl acrylate or methacrylate and ethylene/methacrylic acid/isobornyl acrylate or methacrylate, and combinations thereof. Below is a non-limiting example of the chemical structure for suitable ethylene methacrylic/acrylic acid copolymers:

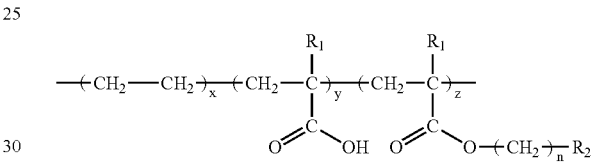

wherein x=50 to 99%; y=1 to 50%; z=0 to 49%; $R_1$=H or $CH_3$; $R_2$=alkyl groups, such as methyl, ethyl, propyl, butyl, pentyl, hexyl, hectyl, octyl, and isobornyl; and n=0 to 12. Suitable ethylene methacrylic/acrylic acid copolymers are sold commercially by DuPont under the tradename NUCREL®. Preferably, the acid-containing ethylene copolymers contain from about 10% to 15% methacrylic acid.

The preferred golf ball compositions include one or more ionomer resins having a flexural modulus from about 1000 psi to 200,000 psi, a grafted metallocene-catalyzed copolymer of an olefin having a flexural modulus from about 500 psi to 100,000 psi, and at least one non-ionomer having a flexural modulus from about 500 to 100,000 psi. More preferably, the ionomer resins having a flexural modulus from about 20,000 psi to 80,000 psi, a grafted metallocene-catalyzed copolymer of an olefin having a flexural modulus from about 1000 psi to 50,000 psi, and at least one non-ionomer having a flexural modulus from about 500 psi to 75,000 psi.

In a more preferred embodiment of the present invention, a maleic anhydride grafted metallocene-catalyzed polymer is combined with a blend of ionomers and an ethylene-methacrylic acid non-ionomer to form a combination blend suitable for use in golf ball centers, intermediate layers, covers, or a combination thereof. In a most preferred embodiment of the present invention, a maleic anhydride grafted metallocene-catalyzed polymer is combined with a blend of a Li-ionomer and a Na-ionomer, and an ethylene-methacrylic acid non-ionomer to form a combination blend suitable for use in a golf ball, preferably in golf ball covers.

The amounts of maleic anhydride grafted metallocene-catalyzed polymers used in the golf ball compositions of the invention can vary from about 5 to 50 phr of the grafted metallocene-catalyzed polymers, from about 95 to 50 phr of ionomer, and from about 1 to 25 phr of non-ionomer, preferably, from about 10 to 40 phr grafted metallocene-catalyzed polymers, from about 90 to 60 phr of ionomer, and about 1 to 20 phr of non-ionomer. The most preferred amounts are from about 15 to 25 phr grafted metallocene-catalyzed polymer, from about 85 to 75 phr of ionomer, and about 1 to 10 phr of non-ionomer.

Grafted metallocene-catalyzed polymer blend layers may be produced in golf balls in accordance with the present invention by injection molding or compression molding a layer of grafted metallocene-catalyzed polymer blend material about a previously formed center and/or core, cover, or intermediate layer. Cores including a grafted metallocene-catalyzed polymer blend may also be formed directly by injection molding or compression molding. When the layer or core is injection molded, a physical or chemical blowing or foaming agent may be included to produce a foamed layer. Blowing or foaming agents useful in forming foamed grafted metallocene-catalyzed polymer blends include, but are not limited to organic blowing agents, such as azobis-formamide; azobisisobutyronitrile; diazoaminobenzene; N,N-dimethyl-N,N-dinitroso terephthalamide; N,N-ini-trosopentamethylene-tetramine; benzenesulfonyl-hydrazide; benzene-1,3-disulfonyl hydrazide; disulfonyl hydrazide; 4,4'-oxybis benzene sulfonyl hydrazide; p-toluene sulfonyl semicarbizide; barium azodicarboxylate; butylamine nitrile; nitroureas; trihydrazino triazine; phenyl-methyl-uranthane; p-sulfonhydrazide; peroxides; and inorganic blowing agents such as ammonium bicarbonate and sodium bicarbonate. A gas, such as air, nitrogen, carbon dioxide, etc., can also be injected into the blend during the injection molding process.

In a further embodiment, foamed grafted metallocene-catalyzed polymer blends may be formed by blending microspheres with the grafted metallocene-catalyzed polymer blend either during or before the molding process. Polymeric, ceramic, metal, and glass microspheres are useful in the invention, and may be solid or hollow and filled or unfilled. Microspheres up to about 1,000 μm in diameter are useful in the grafted metallocene-catalyzed polymer blends of the invention.

For compression molded grafted metallocene-catalyzed polymer blend layers, half-shells may be made by injection molding a grafted metallocene-catalyzed polymer blend in a conventional half-shell mold or by compression molding sheets of foamed grafted metallocene-catalyzed polymer. The half-shells are placed about a previously formed center or core, cover, or intermediate layer, and the assembly is introduced into a compression molding machine, and compression molded at about 250° F. to 400° F. The molded balls are then cooled while still in the mold, and finally removed when the layer of grafted metallocene-catalyzed polymer blend is hard enough to be handled without deforming. Additional center, intermediate, and cover layers are then molded onto the previously molded layers, as needed, until a complete ball is formed. After the final cover layer of the ball has been molded, the ball undergoes various conventional finishing operations such as buffing, painting and stamping.

Blending of the grafted metallocene-catalyzed polymer and ionomer resins is accomplished in a conventional manner using conventional equipment. Good results have been obtained by mixing the grafted metallocene-catalyzed polymer, ionomers, and non-ionomer resins in a solid, pelletized form and then placing the mix into a hopper which is used to feed the heated barrel of the injection molding machine. Further mixing is accomplished by a screw in the heated barrel. The injection molding machine is used either to make preformed half-shells for compression molding or for molding flowable grafted metallocene-catalyzed polymer blend using a retractable-pin mold. Such machines are conventional.

The Cores

Any suitable conventional materials are useful in forming the cores of the golf balls of the invention preferably include, but are not limited to, such core material compositions having a base rubber, a crosslinking agent, a free radical initiator, and a density-adjusting filler. Each component can itself be a mixture.

The base rubber typically includes one or more natural or synthetic rubbers. A preferred base rubber is a high Mooney viscosity unvulcanized rubber, such as 1,4-polybutadiene having at least about 40 percent of a cis-structure. Natural rubber, polyisoprene rubber and/or styrene-butadiene rubber may be optionally used in place of or added to the 1,4-polybutadiene. Additionally, the unvulcanized rubber, such as polybutadiene, in golf balls prepared according to the invention typically has a Mooney viscosity of about 20 or greater, preferably about 30 or greater, and more preferably about 40 or greater. In a preferred embodiment, the core has a Mooney viscosity of about 50 to 70.

The crosslinking agent includes one or more metal salts of unsaturated fatty acids, such as zinc or magnesium salts acrylic or methacrylic acid.

In a preferred embodiment, the cores of the present invention are substantially free of organic sulfides, or completely free of organic sulfides. In one embodiment, the core can further include inorganic sulfides. Suitable inorganic sulfide compounds include, but are not limited to a titanium sulfide, manganese sulfide, and sulfide analogs of iron, calcium, cobalt, molybdenum, tungsten, copper, selenium, yttrium, zinc, tin, potassium, and bismuth. For example, a suitable molybdenum sulfide is molybdenum disulfide. Suitable inorganic sulfide cis-to-trans catalysts are described in U.S. Pat. No. 6,162,135 to Bulpett et al., the disclosure of which is incorporated by reference herein. The cis-to-trans catalyst may also include a blend of the at least one inorganic sulfide compound and at least one of elemental sulfur; polymeric sulfur; or an aromatic organometallic compound. Suitable additional cis-to-trans catalysts to be blended with the inorganic sulfide can be found in U.S. patent application Ser. No. 09/458,676, filed Dec. 10, 1999 and U.S. patent application Ser. No. 09/461,421, filed Dec. 16, 1999, the disclosures of which are incorporated by reference herein.

Density-adjusting fillers useful in the golf ball core of the invention are typically polymeric or mineral particles. Exemplary fillers include precipitated hydrated silica; clay; talc; glass fibers; aramid fibers; barium sulfate; mica; calcium metasilicate; regrind, which is ground, recycled core material (for example, ground to about 30 mesh particle size); zinc sulfide; lithopone; silicates; silicon carbide; diatomaceous earth; carbonates such as calcium carbonate and magnesium carbonate; metals, such as titanium, tungsten, aluminum, bismuth, nickel, molybdenum, iron, copper, boron, cobalt, beryllium, zinc, and tin; metal alloys such as steel, brass, bronze, boron carbide whiskers, and tungsten carbide whiskers; metal oxides such as zinc oxide, iron oxide, aluminum oxide, titanium oxide, tin oxide, magnesium oxide, and zirconium oxide; particulate carbonaceous materials such as graphite, carbon black, cotton flock, natural bitumen, cellulose flock, and leather fiber; micro balloons such as glass and ceramic; fly ash; and combinations thereof.

In a preferred embodiment, the filler includes barium sulfate, tungsten, and zinc oxide. The amount and type of filler utilized is governed by the amount and weight of other ingredients in the composition, since a maximum golf ball weight of 45.93 g (1.62 ounces) has been established by the United States Golf Association (USGA). Appropriate fillers generally used have a preferred specific gravity of about 5 or greater. In one embodiment, the filler has a specific gravity of about 10 to 20.

This combination of rubber and filler can furnish a core with a higher resiliency than conventional polybutadiene. In one embodiment, the resilience index of the core is about 40 or greater, preferably about 45 or greater. In one preferred embodiment, the resilience index of the core is about 50 or greater. The core compression can thus be reduced, thereby decreasing the overall spin rate of the ball without a significant loss in golf ball initial velocity. An exemplary initial ball velocity according to the present invention can advantageously be about 253.5 to 254.5 ft/s. These correspond to CORs of 0.812 and 0.818 respectively. Polymers that produce such resilient cores according to the invention include, but are not limited to, CB23, BR60, or a blend thereof. CB23 is commercially available from Bayer Corporation of Akron, Ohio.

Golf balls according to the invention may incorporate cores including grafted metallocene-catalyzed polymers or polymer blends, non-grafted metallocene-catalyzed polymers or polymer blends, or conventional materials. Cores including at least one grafted metallocene-catalyzed polymer or polymer blend may be either one-piece, including a single piece of foamed or unfoamed grafted metallocene-catalyzed polymer or polymer blend, or multi-piece, including a fluid, hollow, or solid center and one or more intermediate layers in which any of the center or at least one of the layers includes a foamed or unfoamed grafted metallocene-catalyzed polymer, at least one ionomer and at least one non-ionomer, or polymer blend.

The golf ball cores of the present invention may include any of a variety of constructions. For example, the core of the golf ball may be a single layer or may include a plurality of layers. Moreover, the core may be a one-piece core, a multi-layer core, or a wound core, having a solid or fluid center. Indeed, golf balls of the invention may also have conventional wound cores, i.e., have a center with at least one intermediate layer including a tensioned elastomeric thread as disclosed in U.S. Pat. No. 6,149,535, which is incorporated in its entirety by reference herein.

Thread with different material properties, dimensions, cross-sectional shapes, and methods of manufacturing the thread may be used for any tensioned elastomeric layer present in the ball. The material properties of the thread that can be varied include ultimate or maximum elongation and tensile modulus. For example, the thread may be formed from fiber, glass, carbon, or a variety of polymeric materials. Suitable polymers include polyether urea, such as LYCRA®, polyester urea, polyester block copolymers, such as HYTREL®, isotactic-poly(propylene), polyethylene, polyamide, polyketone, poly(ethylene terephthalate), such as DACRON®, poly(p-phenylene terephthalamide), such as KEVLAR®, poly(acrylonitrile), such as ORLON®, copolymers of diaminodicyclohexylmethane and dodecanedicarboxylic acid, such as QUINA®, all of which are commercially available from E. I. DuPont de Nemours & Co. of Wilmington, Del. Other suitable thread materials include cis-polyisoprene rubber, preferably at least about 60% of a blend of two synthetic cis-1,4 polyisoprene rubbers, and about less than 40% of a natural rubber. It is preferred that the synthetic cis-1,4 polyisoprene rubbers have a cis-1,4 content of at least 90%, however the cis-1,4 contents may vary for each rubber. Preferred threads are elastomeric, while graphite thread tends to be less preferred than other available thread types due to the difficulty in placing such threads under tension when being wound about a center.

In one embodiment of the present invention, the core is a solid core having a compression of about 90 or less, more preferably about 80 or less. In another embodiment, the core may have a compression about 65 or greater. It may also be advantageous to have a solid core having a compression from about 65 to 90. In another embodiment, the core may have a compression from about 70 to 80.

In one embodiment, the cores employed in the golf balls of the present invention have a diameter of about 1.51 inches or greater, more preferably about 1.52 inches or greater. In another embodiment, the cores have a diameter of about 1.53 inches or greater.

The coefficient of restitution for the golf ball cores of the present invention is about 0.79 or greater. Preferably, the COR of the core is about 0.8 or greater.

The Inner Cover Layer

The inner cover layer of the present invention includes one or more thermoplastic materials, preferably high flexural modulus ionomer resins, and optionally includes low weight fillers (i.e., fillers with densities less than about 1). Preferably, the inner cover layer is substantially free of polyolefin, polyurethane or both. In one embodiment, the inner cover layer is completely free of polyolefin, polyurethane or both.

Preferably, the ionomer resins used to form the inner cover layer include sodium, lithium, magnesium, potassium, or calcium ionomers. In one embodiment, the inner cover layer is substantially free of zinc ionomer. In a preferred embodiment, the inner cover layer is completely free of zinc ionomer. The preferred ionomers can be obtained by providing a cross-metallic bond to polymers of monoolefin with at least one member selected from the group consisting of unsaturated mono- or di-carboxylic acids having 3 to 12 carbon atoms and esters thereof (the polymer contains 1 to 50 percent by weight of the unsaturated mono- or di-carboxylic acid and/or ester thereof). More particularly, such acid-containing ethylene copolymer ionomer component includes E/X/Y copolymers where E is ethylene, X is a softening comonomer such as acrylate or methacrylate present in 0–50 (preferably 0–25, most preferably 0–20), weight percent of the polymer, and Y is acrylic or methacrylic acid present in 5–35 (preferably at least about 16, more preferably at least about 16–35, most preferably at least about 16–20) weight percent of the polymer, wherein the acid moiety is neutralized 1–90 percent (preferably at least 40 percent, most preferably at least about 60 percent) to form an ionomer by a cation such as lithium, sodium, potassium, magnesium, calcium, or a combination of such cations. Specific acid-containing ethylene copolymers include ethylene/acrylic acid, ethylene/methacrylic acid, ethylene/acrylic acid/n-butyl acrylate, ethylene/methacrylic acid/n-butyl acrylate, ethylene/methacrylic acid/isobutyl acrylate, ethylene/acrylic acid/isobutyl acrylate, ethylene/methacrylic acid/n-butyl methacrylate, ethylene/acrylic acid/methyl methacrylate, ethylene/acrylic acid/methyl acrylate, ethylene/methacrylic acid/methyl acrylate, ethylene/methacrylic acid/methyl methacrylate, and ethylene/acrylic acid/n-butyl methacrylate. Preferred acid-containing ethylene copolymers include ethylene/methacrylic acid, ethylene/acrylic acid, ethylene/methacrylic acid/n-butyl acrylate, ethylene/acrylic acid/n-butyl acrylate, ethylene/methacrylic acid/methyl acrylate and ethylene/acrylic acid/methyl acrylate copolymers. The most preferred acid-containing ethylene copolymers are ethylene/methacrylic acid, ethylene/acrylic acid, ethylene/(meth)acrylic acid/n-butyl acrylate, ethylene/(meth)acrylic acid/ethyl acrylate, and ethylene/(meth)acrylic acid/methyl acrylate copolymers. Such ionomer resins are commercially available from E. I. DuPont de Nemours and Co. under the tradename SURLYN®, and from Exxon under the tradename IOTEK®. Some particularly suitable SURLYNS® include SURLYN® 7940, an ethylene/methacrylic acid (E/MAA) copolymer, in which the MAA acid groups have been partially neutralized with lithium ions, and SURLYN® 8945, a medium/high acid, high neutralization area of the ionomer spectrum.

In one embodiment, the inner cover layer includes a thermoset material. Examples of suitable thermoset materials are provided in U.S. Pat. Nos. 5,334,673 and 5,484,870, the entire disclosures of which are incorporated by reference herein. Other examples of suitable thermoset materials include, but are not limited to thermoset polyurethanes, polyetheresters, polyetheramides, or polyesters, or blends thereof. Polybutadiene, natural rubber, polyisoprene, styrene-butadiene, or styrene-propylene-diene rubber are also particularly suitable when used in an inner layer of a golf ball.

The inner cover layer material preferably has a Shore D hardness of about 60 or greater. Preferably, the inner cover layer material has a Shore D hardness of about 65 to 80, more preferably about 68 to 74, and most preferably about 70 to 72. The inner cover layer material of the present invention preferably has a flexural modulus of at least about 60,000 psi, and most preferably about 60,000 psi to 120,000 psi.

The thickness of the inner cover layer can range from about 0.01 inches to 0.039 inches. In one embodiment, the inner cover layer has a thickness from about 0.02 inches to 0.039 inches, and in another embodiment, the thickness is from about 0.025 inches to 0.039 inches.

The inner cover layer of the present invention preferably has a COR of about 0.8 or greater. In a preferred form of the invention, the COR of the inner cover layer is about 0.81 or greater.

The Outer Cover Layer

Golf balls according to the invention include at least one outer cover layer including one or more foamed or unfoamed grafted metallocene-catalyzed polymer and at least one ionomer component, or polymer blend thereof. Optionally, the blends further include one or more non-grafted metallocene-catalyzed polymers or polymer blends, or other conventional cover materials, including balata cover stock. Grafted metallocene-catalyzed polymer blend outer cover layers according to the invention may be used with any conventional core construction, such as solid or wound cores. In one embodiment, the outer cover layer of a golf ball according to the invention further includes at least one non-ionomer.

The outer cover layers employed in the golf balls of the present invention are formed preferably by injection or compression molding, reaction injection molding, casting, or another process(es) available to those of ordinary skill in the art of manufacturing golf balls.

The outer cover layer surrounds the inner cover layer and contains about 20 weight percent or greater, preferably about 30 weight percent or greater, and more preferably about 35 weight percent or greater of a grafted metallocene-catalyzed polymer.

The at least one ionomer component of the blend can include at least two ionomer resins, each neutralized with a different metal cation selected from the group consisting of Zn, Na, Li, Ca, K, and Mg.

Other additional non-ionomeric polyolefin materials which are suitable for inclusion in the outer cover layer include, but are not limited to, low density polyethylene, linear low density polyethylene, high density polyethylene, polypropylene, rubber-toughened olefin polymers, acid copolymers which do not become part of an ionomeric copolymer when used in the outer cover layer, plastomers, flexomers, and thermoplastic elastomers such as SBS (styrene/butylene/styrene) or SEBS (styrene/ethylene-butylene/styrene) block copolymers, including Kraton (Shell), dynamically vulcanized elastomers such as Santoprene (Monsanto), ethylene vinyl acetates such as Elvax (DuPont), and ethylene methyl acrylates such as Optema (Exxon), or mixtures thereof It is desirable that the polyolefin be a tough, low density material. The outer cover layer optionally may include a metal stearate, such as zinc stearate, or another mineral filler or metal fatty acid salt. In a preferred form of the invention, the outer cover layer also contains a plastomer, preferably at least 50 weight percent plastomer. The outer cover layer materials preferably each have a flexural modulus of about 10,000 psi or greater.

The amount of the ionomer in the blend can help adjust the melt flow index to optimal levels to facilitate injection or compression molding and can also impart cut resistance and general durability to covers made with the blend.

The outer cover layer is preferably more compressible than the inner cover layer, thereby imparting to the golf ball a favorable "soft" feel without substantially reducing the overall COR of the ball. The outer cover layer material preferably has a Shore D hardness from about 51 to 60, more preferably from about 53 to 56, and most preferably about 55. In another embodiment, the outer cover layer material has a Shore D hardness from about 45 to 60. On the other hand, the inner cover layers have a Shore D hardness of more than about 60. Preferably, the inner cover layer material Shore D hardness is at least about 1 percent greater than the outer cover layer material, preferably from about 8 percent to 56 percent greater. More preferably, the inner cover layer material Shore D hardness is about 29 percent greater than the outer cover layer material Shore D hardness.

The outer cover layer has a thickness of about 0.01 inches to 0.1 inches. In one preferred embodiment, the outer cover layer thickness is from about 0.02 inches to 0.07 inches, and in another preferred embodiment, the thickness is from about 0.04 inches to 0.06 inches.

Further compositions may also be added to the compatible blends of the invention, such as, for example, coloring agents, reaction enhancers, crosslinking agents, dyes, lubricants, density-adjusting fillers, excipients, process aids and other compounds commonly added to polymeric materials and/or golf ball covers.

The present invention relates to golf balls of any size. While United States Golf Association ("USGA") specifications limit the size of a competition golf ball to more than 1.68 inches in diameter, golf balls of any size can be used for leisure golf play. The preferred diameter of the golf balls is from about 1.68 inches to 1.8 inches. The more preferred diameter is from about 1.68 inches to 1.76 inches.

When golf balls are prepared according to the invention, they can have dimple coverage about 60 percent or greater, preferably about 65 percent or greater, and more preferably about 70 percent or greater. The flexural modulus of the cover of the golf balls, as measured by ASTM D-790, is generally about 500 psi or greater, and is preferably from about 500 psi to 150,000 psi. More preferably, the flexural modulus of the cover is from about 1,000 psi to 100,000 psi.

The hardness of the cover material may be from about 35 to 80 Shore D, preferably from about 40 to 78 Shore D, and more preferably from about 45 to 75 Shore D.

In one embodiment, a golf ball according to the invention has a compression of about 80 or less, a COR of about 0.8 or greater, or both.

In an alternative embodiment of the present invention, the intermediate layer and cover are formed of a polymer blend including at least one grafted metallocene-catalyzed polymer, at least one ionomer, at least one non-ionomer, and a thermoset or thermoplastic material.

The core may also include a center and at least one intermediate layer disposed between the center and the cover. The at least one intermediate layer may include the polymer blend while the cover includes a thermoset or thermoplastic material. Additionally, the cover may include the polymer blend and a thermoplastic material. It should also be understood that if the cover includes the polymer blend, the intermediate layer may include a thermoplastic or a thermoset material, the thermoplastic and thermoset material in the intermediate layer may be the same or different as those used in the blend, if present. It is preferred that the thermoplastic material include at least one ionomer, however, it should be understood that thermoplastic material may also be a non-ionomeric material. Preferred thermoset materials, if used, include polyureas, polyurethanes, and mixtures thereof.

EXAMPLES

These and other aspects of the present invention may be more fully understood by reference to the following examples. While these examples are meant to be illustrative of golf balls made according to the present invention, the present invention is not meant to be limited by the following examples. All parts are by weight unless otherwise specified.

Examples 1–13

Effect of Maleic-Anhydride-Grafted Metallocene Cover Blends on Ball Properties.

As shown in Table 1, batches of 10 to 15 dozen golf balls were prepared having covers incorporating blends of SURLYN® 7940, a copolymer of ethylene and about 14 to 16 percent methacrylic acid, having about 30 to 60 percent of the acid groups neutralized with lithium, and a Shore D hardness of about 68, blended with one of EXACT® 4033-MA, a maleic anhydride grafted ethylene-butene metallocene-catalyzed polymer, ENGAGED 8180-MA, a maleic anhydride grafted ethylene-octene metallocene-catalyzed polymer, EXACT® 4049 an unfunctionalized ethylene-butene metallocene-catalyzed polymer, ENGAGE® 8180, an unfunctionalized ethylene-octene metallocene-catalyzed polymer, and SURLYN® 8320, a very low modulus ionomer ("VLMI"), ie., a terpolymer of ethylene, 8 to 11 percent methacrylic acid, and n-butyl acrylate, having about 40 to 60 percent of the acid groups neutralized with sodium and a Shore D hardness of about 35.

As is clearly shown in Table 1, golf balls in accordance with the invention, i.e., golf balls incorporating blends including maleic anhydride functionalized metallocene-catalyzed polymers, have an initial velocity that is typically significantly better than that of golf balls having covers including VLMI or unfunctionalized metallocene-catalyzed polymers in an amount equivalent to that of the maleic anhydride functionalized metallocene-catalyzed polymers used in the examples. Moreover, the results shown in Table 1 demonstrate that golf balls in accordance with the present invention provide performance that is at least as good, if not superior to golf balls having ionomer blend covers, while having a softer cover, which provides a softer "feel." Although the compression of each of the golf balls of the invention exemplified in Table 1 is relatively low, i.e., having an ATTI compression in the range of 88 to 92, the coefficient of restitution of the golf balls of the invention is at least as high, and, in many cases, significantly better than that of the high compression balls incorporating maleic anhydride modified polymers as disclosed in the Sullivan patents described above. Moreover, tests have shown that the golf balls of the invention are also far more durable than golf balls including ionomers blended with polymers formed using catalysts other than metallocenes, such as those disclosed in the Sullivan patents.

TABLE 1

Effect of Maleic-anhydride-grafted Metallocene Cover Blends on Ball Properties

| Ingredients | #1 | #2 | #3 | #4 | #5 | #6 | #7 | #8 | #9 | #10 | #11 | #12 | #13 |
|---|---|---|---|---|---|---|---|---|---|---|---|---|---|
| SURLYN® 7940[1] | 80.95 | 66.67 | 52.38 | 80.95 | 66.67 | 52.38 | 80.95 | 66.67 | 80.95 | 66.67 | 80.95 | 66.67 | 52.38 |
| EXACT® 4033-MA[2] | 14.29 | 28.57 | 42.86 | | | | | | | | | | |
| EXACT® 4049[3] | | | | 14.29 | 28.57 | 42.86 | | | | | | | |
| ENGAGE® 8180-MA[4] | | | | | | | 14.29 | 28.57 | | | | | |
| EXACT® 8180[5] | | | | | | | | | 14.29 | 28.57 | | | |
| SURLYN® 8320[6] | | | | | | | | | | | 14.29 | 28.57 | 42.86 |
| TiO$_2$ concentrate[7] | 4.76 | 4.76 | 4.76 | 4.76 | 4.76 | 4.76 | 4.76 | 4.76 | 4.76 | 4.76 | 4.76 | 4.76 | 4.76 |
| Ball Properties | | | | | | | | | | | | | |
| ATTI Compression | 92 | 91 | 88 | 92 | 89 | 86 | 92 | 89 | 90 | 87 | 93 | 90 | 89 |
| Hardness (Shore D)[8] | 64 | 60 | 54 | 64 | 58 | 53 | 64 | 58 | 62 | 57 | 67 | 62 | 58 |
| Initial velocity (ft/s) | 252.5 | 252.2 | 251.6 | 252.1 | 252.0 | 251.6 | 252.2 | 251.9 | 251.9 | 251.7 | 252.2 | 251.3 | 250.8 |
| COR @ 125 ft/s | 0.807 | 0.802 | 0.796 | 0.803 | 0.800 | 0.796 | 0.805 | 0.798 | 0.802 | 0.797 | 0.803 | 0.797 | 0.792 |

[1]SURLYN® 7940 is a copolymer of ethylene and methacrylic acid partially neutralized with Li ion
[2]EXACT® 4033-MA is a maleic anhydride grafted ethylene-butene metallocene-catalyzed copolymer
[3]EXACT® 4049 is an unfunctionalized ethylene-butene metallocene-catalyzed copolymer
[4]ENGAGE® 8180-MA is a maleic anhydride grafted ethylene-octene metallocene-catalyzed copolymer
[5]ENGAGE® 8180 is an unfunctionalized ethylene-octene metallocene-catalyzed copolymer
[6]SURLYN® 8320 is a terpolymer of ethylene and methacrylic acid and n-butyl acrylate partially neutralized with Na ion
[7]TiO$_2$ concentrate is TiO$_2$ dispersed in SURLYN® carrier resin containing 9–11% MAA partially neutralized with Na ion.
[8]ASTM - D2240

Examples 14–15

Golf Ball Cover Prepared According to the Present Invention Compared to Conventional Cover.

As shown in Table 2, two blends were prepared. Example 14 includes: (a) SURLYN® 7940, a copolymer of ethylene and up to about 15 percent methacrylic acid, having about 40 to 60 percent of the acid groups neutralized with lithium; (b) SURLYN® 8945, a copolymer of ethylene, about 15 percent methacrylic acid, having about 20 to 40 percent of the acid groups neutralized with sodium; (c) SURLYN® NMO 525D, a maleic anhydride grafted ethylene-butene metallocene-catalyzed polymer; and (d) $TiO_2$ concentrate dispersed in SURLYN® carrier resin containing 9–11 % methacrylic acid partially neutralized with sodium ion. Example 15 includes: (a) SURLYN® 7940; (b) SURLYN(D 8945; (c) NUCREL® 960, a non-ionomeric ethylene-methacrylic acid polymer having about 10 percent acid groups; (d) SURLYN® NMO 525D, maleic anhydride grafted ethylene-butene metallocene-catalyzed polymer; and (e) $TiO_2$ concentrate.

TABLE 2

Effect of Non-ionomer in Cover Compositions and Material Properties

|  | Example 14 (prior art) | Example 15 |
| --- | --- | --- |
| Ingredients |  |  |
| SURLYN ® 7940 (ionomer) | 60 | 60 |
| SURLYN ® 8945 (ionomer) | 20 | 10 |
| SURLYN ® NMO 525D (grafted metallocene-catalyzed polymer) | 20 | 20 |
| NUCREL ® 960 (non-ionomer) | — | 10 |
| $TiO_2$ concentrate | 5 | 5 |
| Blend Properties |  |  |
| Melt Flow Index[1] (g/10 min) | 1.96 | 2.5 |
| Flexural Modulus[2] (kpsi) | 44.9 | 37.0 |
| Hardness (Shore D)[3] | 55 | 54 |

[1] measured at 190° C. under 2.16-kg load; ASTM-D1238
[2] ASTM-D790
[3] ASTM-D2240

Examples 14 and 15 are both reactive blends that include maleic-anhydride-grafted metallocene-catalyzed ethylene-butene copolymer. Table 2 also shows the surprising and unexpected results arising from the addition of a non-ionomeric component to Example 15. The melt flow index of Example 15 is about 28% higher than that exhibited by Example 14, which facilitates processing of the cover. Additionally, the flexural modulus of Example 15 is advantageously about 18% lower than that exhibited by Example 14. The higher melt flow index allows the temperature range at which the blend may be effectively molded to be significantly broader than, for example, the temperature range available for properly molding components including the blend of Example 14 (i.e., the blend of Example 14 has a much narrower temperature window). The larger temperature window in which to properly mold the golf ball covers and components allows more opportunities for better optimization of the molding process, resulting in more homogeneous and consistent golf balls.

Using the blends disclosed in Table 2, two golf balls were constructed, the first having a cover constructed of the blend of Example 14 and the second having a cover constructed of the blend of Example 15. For both golf balls, cores having about a 1.590-in diameter were used. The cores were a blend of polybutadiene, a peroxide initiator, zinc diacrylate, regrind, and pigment. This blend resulted in each core having a compression of about 73 and a hardness of about 80 Shore C. Half-shell cups were made using the above cover formulations (see Table 2) and were molded over the about 1.590-in-diameter cores. The two golf balls were tested for a variety of physical and mechanical properties, some of the results of which are shown, in tabular form, in Table 3 below.

TABLE 3

Effect of Non-ionomer in Cover Compositions on Ball Properties

| Properties | Example 14 (prior art) | Example 15 |
| --- | --- | --- |
| ATTI Compression | 78 | 75 |
| Cover Hardness (Shore D) | 60 | 60 |
| Coefficient of Restitution (at 125 ft/s) | 0.802 | 0.802 |
| Initial Velocity (ft/s) | 251.8 | 251.9 |
| Spin Rate from Standard Driver (rpm) | 3381 | 3363 |
| Spin Rate from Average Driver (rpm) | 3641 | 3582 |
| Spin Rate from 8-iron (rpm) | 7877 | 7872 |
| Spin Rate from Half Wedge (rpm) | 6445 | 6532 |

Table 3 clearly shows surprising and unexpected results exhibited by the golf ball having a cover that further includes a non-ionomeric component (Example 15), as disclosed in Table 2. Golf ball compression decreased, compared to a golf ball having a cover constructed with the blend of Example 14, without any associated adverse change in cover hardness, coefficient of restitution, initial velocity, and spin rates from an average driver, an 8-iron, and a half-wedge. As such, the lower ball compression of the golf ball of Example 15 may provide better "feel" than the golf ball of Example 14, but without any loss of any beneficial golf ball properties.

Examples 16–19

Golf Balls With Ionomer Resin Inner Covers and Grafted Metallocene-Catalyzed Polymer-Containing Outer Cover Layers According to the Invention Golf balls according to the present invention were prepared with a solid core, an inner cover layer surrounding the solid center, and an outer cover layer surrounding the inner cover layer.

The cores were formed of the solid polybutadiene composition shown below in Table 4 with diameters of about 1.52 inches and about 1.48 inches. Table 5 compares the various statistics and testing results of the cores made according to Table 4.

TABLE 4

Core Composition

| | Example No. | | | |
| --- | --- | --- | --- | --- |
| Core Constituent | 16 | 17 | 18 | 19 |
| Zinc Diacrylate | 0.162 | 0.183 | 0.163 | 0.171 |
| Zinc Oxide | 0.029 | 0.029 | 0.029 | 0.028 |
| Tungsten Filler | 0.128 | 0.119 | 0.139 | 0.136 |

TABLE 4-continued

Core Composition

| | Example No. | | | |
|---|---|---|---|---|
| Core Constituent | 16 | 17 | 18 | 19 |
| CB23 Polybutadiene | 0.676 | 0.665 | 0.665 | 0.661 |
| Coloring | 0.001 | 0.001 | 0.001 | 0.001 |
| Trigonox-265[1] | 0.004 | 0.004 | 0.004 | 0.004 |

[1]Trigonox-265 is a mixture of 1,1-di(t-butylperoxy)-3,3,5-trimethycyclohexane and di(2-t-butylperoxyisopropyl)benzene and is commercially available from Akzo Nobel Chemicals, Inc. of Chicago, Illinois.

TABLE 5

Core Properties

| Example No. | Diameter (in.) | Compression | COR |
|---|---|---|---|
| 16 | 1.526 | 56 | 0.796 |
| 17 | 1.522 | 78 | 0.803 |
| 18 | 1.484 | 47 | 0.791 |
| 19 | 1.481 | 64 | 0.794 |

The inner cover layer (55 percent SURLYN® 7940; 45 percent SURLYN® 8945) was formed around the core according to the invention. Comparative golf balls 16a–19a were also prepared having the same core characteristics corresponding to Examples 16–19, but with different inner cover layer characteristics (60 percent SURLYN® 7940; 25 percent SURLYN® 8945; and 15 percent FUSABOND® 525D) formed around the core. Table 6 compares the various properties and results of the inner cover layer as described.

TABLE 6

Inner Cover Layer Properties

| Example No. | Diameter (in.) | Compression | COR | Shore C |
|---|---|---|---|---|
| 16 | 1.593 | 64 | 0.811 | 87 |
| 17 | 1.593 | 78 | 0.818 | 90 |
| 18 | 1.555 | 59 | 0.809 | 88 |
| 19 | 1.557 | 68 | 0.813 | 90 |
| Comparative Ex. 16a | 1.597 | 67 | 0.806 | 83 |
| Comparative Ex. 17a | 1.595 | 77 | 0.815 | 85 |
| Comparative Ex. 18a | 1.558 | 59 | 0.803 | 81 |
| Comparative Ex. 19a | 1.554 | 68 | 0.809 | 83 |

The outer cover layer (47 percent SURLYN® 7940; 18 percent SURLYN® 8945; and 35 percent FUSABOND® 525D) was formed around the inner cover layer. Table 7 compares the various properties and results of the finished golf balls of the present invention and comparison balls.

TABLE 7

Finished Balls According to the Invention

| Example No. | Ball Diameter (in.) | Compression | COR | Shore D |
|---|---|---|---|---|
| 16 | 1.684 | 78 | 0.811 | 55 |
| 17 | 1.684 | 89 | 0.819 | 55 |
| 18 | 1.679 | 78 | 0.806 | 52 |
| 19 | 1.679 | 85 | 0.810 | 54 |
| Comparative Ex. 16a | 1.682 | 75 | 0.810 | 54 |
| Comparative Ex. 17a | 1.685 | 88 | 0.817 | 54 |
| Comparative Ex. 18a | 1.679 | 75 | 0.821 | 54 |
| Comparative Ex. 19a | 1.679 | 81 | 0.809 | 53 |

TABLE 7-continued

Finished Balls According to the Invention

| Example No. | Ball Diameter (in.) | Compression | COR | Shore D |
|---|---|---|---|---|
| Prior Art Ball A | 1.682 | 87 | 0.813 | 66 |
| Prior Art Ball B | 1.682 | 88 | 0.788 | 48 |
| Prior Art Ball C | 1.681 | 89 | 0.788 | 58 |
| Prior Art Ball D | 1.681 | 96 | 0.790 | 57 |

As shown in the above chart, the golf balls of Examples 17 and 19 have higher resiliency, with the exception of the similar COR of Prior Art Ball A, relatively similar compression, and a relatively low Shore D hardness as compared to the other well-known golf balls of Prior Art Balls A–D. Examples 16 and 18 have a similar resiliency to Prior Art Balls A, but higher than the Prior Art Balls B–D. Comparative Examples 16a–19a have similar ball properties to the golf balls prepared according to the invention, but the compression is slightly lower. Importantly, the golf ball of the present invention have low driver spin, a softer outer cover, and a high coefficient of restitution.

The golf balls of Examples 17 and 19 were used to test the performance, in particular the spin rate. Golf balls were prepared as outlined above according to Example 17 and Comparative Example 17a (diameter=1.522 inches; 78.1 core compression) and Example 19 and Comparative Example 19a (1.481; 64.1 core compression). The outer cover layers (47 percent SURLYN® 7940; 18 percent SURLYN® 8945; and 35 percent FUSABOND® 525D) were formed around the core.

Table 8 compares the driver spin rates of the golf balls according to the present invention and comparison balls using a standard driver.

TABLE 8

Driver Spin Rates of Finished Balls

| | Test #1 (N = 24) | | Test #2 (N = 24) | |
|---|---|---|---|---|
| Ball Type | Spin (rpm) | Speed (ft/s) | Spin (rpm) | Speed (ft/s) |
| Example 17 | 3096 | 158.8 | 3478 | 139.2 |
| Example 19 | 3029 | 158.3 | 3462 | 138.7 |
| Comparative Ex. 17a | 3147 | 158.7 | 3532 | 139.0 |
| Comparative Ex. 19a | 3055 | 158.1 | 3409 | 138.5 |
| Comparative Ex. A | 2915 | 159.0 | 3267 | 139.4 |
| Comparative Ex. B | 3983 | 156.8 | 4429 | 137.4 |
| Comparative Ex. C | 3036 | 156.4 | 3381 | 137.7 |
| Comparative Ex. D | 3012 | 156.1 | 3432 | 136.8 |

As is evident from the above chart, the golf balls according to the present invention have similar, if not better, spin rates than the commercially available balata and low ionomer resin covered balls.

It is to be understood that the invention is not to be limited to the exact configuration as illustrated and described herein. For example, it should be apparent that a variety of materials would be suitable for use in the composition or method of making the golf ball according to the Detailed Description. Accordingly, all expedient modifications readily attainable by one of ordinary skill in the art from the disclosure set forth herein, or by routine experimentation therefrom, are deemed to be within the spirit and scope of the invention as defined by the appended claims.

The invention described and claimed herein is not to be limited in scope by the specific embodiments herein disclosed, since these embodiments are intended solely as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

What is claimed is:

1. A golf ball comprising:
   a core comprising polybutadiene and substantially free of organic sulfide;
   an inner cover having at least one layer comprising a material having a first Shore D hardness formed over the core and comprising at least two thermoplastic materials, each neutralized with a different metal cation, and wherein the inner cover is substantially free of metallocene-catalyzed polymer; and
   an outer cover having at least one layer comprising a polymer blend having a second Shore D hardness less than the first Shore D hardness, disposed about the inner cover, wherein the polymer blend comprises at least one grafted metallocene-catalyzed polymer, a non-ionomeric material comprising an acid-containing ethylene copolymer, and at least two ionomer resins, each neutralized with a different metal cation.

2. The golf ball of claim 1, wherein the polymer blend comprises about 30 percent by weight or greater of the at least one grafted metallocene-catalyzed polymer.

3. The golf ball of claim 1, wherein the at least one grafted metallocene-catalyzed polymer has been functionalized by grafting an ethylenically-unsaturated monomer onto the at least one metallocene-catalyzed polymer using a post-polymerization reaction.

4. The golf ball of claim 1, wherein the core is fluid-filled.

5. The golf ball of claim 1, wherein the golf ball further comprises at least one intermediate layer between the core and the inner cover layer.

6. The golf ball of claim 5, wherein the intermediate layer is a tensioned elastomeric layer.

7. The golf ball of claim 1, wherein the acid-containing ethylene copolymer comprises a copolymer represented by the following structure:

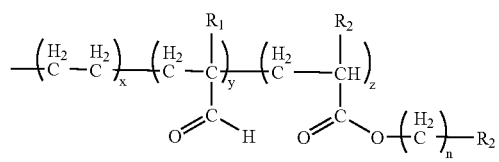

where x=50 to 99 percent, y=1 to 50 percent, z=0 to 49 percent, $R_1$ is H or $CH_3$, $R_2$ is an alkyl group, and n ranges from 0 to 12.

8. The golf ball of claim 7, wherein the acid-containing ethylene copolymer comprises about 10 to about 15 percent methacrylic acid.

9. A golf ball comprising a core, a layer disposed about the core, and a cover, wherein at least one of the core, the layer, or the cover is formed of a blend comprising:
   at least one ionomer;
   at least one grafted metallocene-catalyzed polymer; and
   at least one non-ionomeric material comprising an acid-containing ethylene copolymer.

10. The golf ball of claim 9, wherein the blend is present in the cover.

11. The golf ball of claim 10, wherein the layer comprises at least one ionomer.

12. The golf ball of claim 11, wherein the layer is substantially free of metallocene-catalyzed polymer.

13. The golf ball of claim 9, wherein the at least one ionomer is present in an amount of about 99 to about 25 parts per hundred of the blend, wherein the at least one grafted metallocene-catalyzed polymer blend is present in an amount of about 1 to about 75 parts per hundred of the blend, and wherein the at least one non-ionomeric material is present in an amount of about 1 to about 70 parts per hundred of the blend.

14. The golf ball of claim 13, wherein the at least one ionomer is present in an amount of about 90 to about 70 parts per hundred of the blend, wherein the at least one grafted metallocene-catalyzed polymer blend is present in an amount of about 10 to about 30 parts per hundred of the blend, and wherein the at least one non-ionomeric material is present in an amount of about 1 to about 20 parts per hundred of the blend.

15. The golf ball of claim 9, wherein the layer has a hardness from about 65 Shore D to 80 Shore D and the cover has a second hardness is about 45 Shore D to 60 Shore D.

16. The golf ball of claim 9, wherein the acid-containing ethylene copolymer comprises a copolymer represented by the following structure:

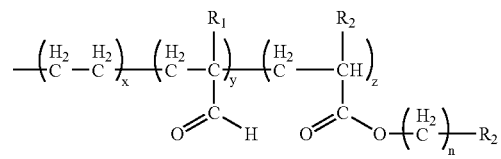

where x=50 to 99 percent, y=1 to 50 percent, z=0 to 49 percent, $R_1$ is H or $CH_3$, $R_2$ is an alkyl group, and n ranges from 0 to 12.

17. The golf ball of claim 16, wherein the acid-containing ethylene copolymer comprises about 10 to about 15 percent methacrylic acid.

* * * * *